(12) United States Patent
Marris

(10) Patent No.: US 12,151,171 B2
(45) Date of Patent: Nov. 26, 2024

(54) RATING TASKS AND POLICIES USING CONDITIONAL PROBABILITY DISTRIBUTIONS DERIVED FROM EQUILIBRIUM-BASED SOLUTIONS OF GAMES

(71) Applicant: DeepMind Technologies Limited, London (GB)

(72) Inventor: Luke Christopher Marris, London (GB)

(73) Assignee: DeepMind Technologies Limited, London (GB)

( * ) Notice: Subject to any disclaimer, the term of this patent is extended or adjusted under 35 U.S.C. 154(b) by 283 days.

(21) Appl. No.: 17/963,113

(22) Filed: Oct. 10, 2022

(65) Prior Publication Data

US 2023/0140899 A1     May 11, 2023

Related U.S. Application Data

(60) Provisional application No. 63/253,821, filed on Oct. 8, 2021.

(51) Int. Cl.
   *A63F 13/798*    (2014.01)
   *A63F 13/822*    (2014.01)
   *G06F 17/18*     (2006.01)

(52) U.S. Cl.
   CPC .......... *A63F 13/798* (2014.09); *A63F 13/822* (2014.09); *G06F 17/18* (2013.01)

(58) Field of Classification Search
   CPC ...... A63F 13/798; A63F 13/822; G06F 17/18; G06N 7/01; G06N 3/006; G06N 3/086; G06N 5/01; G06N 3/084
   (Continued)

(56) References Cited

U.S. PATENT DOCUMENTS 10,552,764 B1 *   2/2020  Carlin ................... G06N 20/00
11,188,848 B1 * 11/2021  Carlin ................... G06N 7/01
(Continued)

OTHER PUBLICATIONS

International Preliminary Report on Patentability in International Appln. No. PCT/EP2022/078056, dated Apr. 18, 2024, 7 pages.
(Continued)

*Primary Examiner* — Pierre E Elisca
(74) *Attorney, Agent, or Firm* — Fish & Richardson P.C.

(57) ABSTRACT

Methods, systems, and apparatus, including computer programs encoded on a computer storage medium, for rating tasks and policies using conditional probability distributions derived from equilibrium-based solutions of games. One of the methods includes: determining, for each action selection policy in a pool of action selection policies, a respective performance measure of the action selection policy on each task in a pool of tasks, processing the performance measures of the action selection policies on the tasks to generate data defining a joint probability distribution over a set of action selection policy-task pairs, and processing the joint probability distribution over the set of action selection policy-task pairs to generate a respective rating for each action selection policy in the pool of action selection policies, where the respective rating for each action selection policy characterizes a utility of the action selection policy in performing tasks from the pool of tasks.

20 Claims, 12 Drawing Sheets

(58) Field of Classification Search
USPC .......................................................... 463/9
See application file for complete search history.

(56) References Cited

U.S. PATENT DOCUMENTS

| | | | | |
|---|---|---|---|---|
| 11,627,165 | B2* | 4/2023 | Silver | G06N 3/006 726/1 |
| 12,067,491 | B2* | 8/2024 | Silver | G06N 3/08 |
| 2023/0244936 | A1* | 8/2023 | Silver | G06N 3/08 726/1 |

OTHER PUBLICATIONS

Anthony et al., "Learning to Play No-Press Diplomacy with Best Response Policy Iteration," Advances in Neural Information Processing Systems 33, 2020, 17 pages.
Aumann, "Subjectivity and correlation in randomized strategies," Journal of Mathematical Economics, 1974, 1:67-96.
Balduzzi et al., "Open-ended learning in symmetric zero-sum games," Proceedings of the 36th International Conference on Machine Learning, 2019, 97:434-443.
Balduzzi et al., "Re-Evaluating Evaluation," 32nd Conference on Neural Information Processing Systems, 2018, 21 pages.
Bansal et al., "Emergent Complexity via Multi-Agent Competition," CoRR, Oct. 10, 2017, arxiv.org/abs/1710.03748, 12 pages.
Bloembergen et al., "Evolutionary Dynamics of Multi-Agent Learning: A Survey," Journal of Artificial Intelligence Research, Aug. 17, 2015, 53:659-697.
Czarnecki et al., "Real World Games Look Like Spinning Tops," Advances in Neural Information Processing Systems 33, 2020, 12 pages.
Du et al., "Estimating α-Rank from a Few Entries with Low Rank Matrix Completion," International Conference on Machine Learning, 2021, 139:2870-2879.
Farina et al., "Coarse Correlation in Extensive-Form Games," CoRR, Aug. 26, 2019, arXiv:1908.09893, 13 pages.
Farina et al., "Correlation in Extensive-Form Games: Saddle-Point Formulation and Benchmarks," Advances in Neural Information Processing Systems 32, 2019, 11 pages.
Feng et al., "Discovering multi-agent auto-curricula in two-player zero-sum games," CoRR, Jun. 4, 2021, arXiv.2106.02745, 34 pages.
Forestier et al., "Intrinsically motivated goal exploration processes with automatic curriculum learning," CoRR, Jul. 24, 2020, arXiv. 1708.02190, 33 pages.
Foster et al., "Calibrated Learning and Correlated Equilibrium," Games and Economic Behavior, Jan. 24, 1996, 21:40-55.
Gemp et al., "EigenGame: PCA as a Nash Equilibrium," CoRR, Oct. 1, 2020, arXiv:2010.00554, 39 pages.
Gemp et al., "Sample-based Approximation of Nash in Large Many-Player Games via Gradient Descent," CoRR, Jun. 2, 2021, arXiv:2106.01285, 34 pages.
Goldberg et al., "Reducibility among equilibrium problems," STOC '06: Proceedings of the thirty-eighth annual ACM symposium on Theory of Computing, May 2006, pp. 61-70.
Hart et al., "A Simple Adaptive Procedure Leading to Correlated Equilibrium," Econometrica, Sep. 2000, 68(5):1127-1150.
Heinrich et al., "Deep Reinforcement Learning from Self-Play in Imperfect-Information Games," CoRR, Jun. 28, 2016, arXiv:1603. 01121, 10 pages.
Herbrich et al., "Trueskill™: A bayesian skill rating system," Advances in Neural Information Processing Systems 19, 2006, pp. 569-576.
Hernandez-Leal et al., "A survey and critique of multiagent deep reinforcement learning," Autonomous Agents and Multi-Agent Systems vol. 33, Aug. 30, 2019, pp. 750-797.
International Search Report and Written Opinion in International Appln. No. PCT/EP2022/078056, dated Dec. 12, 2022, 14 pages.
Jabri et al., "Unsupervised curricula for visual meta-reinforcement learning," CoRR, Dec. 9, 2019, arXiv.1912.04226, 21 pages.

Jaderberg et al., "Humanlevel performance in 3D multiplayer games with population- based reinforcement learning," Science, May 31, 2019, 364(6443):859-865.
Jaynes, "Information Theory and Statistical Mechanics," Phys. Rev. 106, May 1957, 4:620-630.
Lanctot et al., "A Unified Game-Theoretic Approach to Multiagent Reinforcement Learning," 31st Conference on Neural Information Processing Systems, 2017, 14 pages.
Lanctot et al., "Monte Carlo Sampling for Regret Minimization in Extensive Games," Advances in Neural Information Processing Systems 22, 2009, 9 pages.
Lanctot et al., "OpenSpiel: A Framework for Reinforcement Learning in Games," CoRR, Dec. 31, 2019, arXiv:1908.09453v5, 27 pages.
Leibo et al., "Autocurriculaand the Emergence of Innovation from Social Interaction: A Manifesto for Multi-Agent Intelligence Research," CoRR, Mar. 11, 2019, arXiv:1903.00742, 16 pages.
Marris et al., "Multi-Agent Training beyond Zero-Sum with Correlated Equilibrium Meta-Solvers," Proceedings of the 38th International Conference on Machine Learning, 2021, 139:12 pages.
McAleer et al., "Pipeline PSRO: a scalable approach for finding approximate Nash equilibria in large games," CoRR, Feb. 18, 2021, arXiv:2006.08555v2, 17 pages.
McKelvey et al., "Quantal response equilibria for normal form games," Games and Economic Behavior, Jul. 1995, 10(1):6-38.
McMahan et al., "Planning in the presence of cost functions controlled by an adversary," Proceedings of the 20th International Conference on Machine Learning (ICML-2003), 2003, pp. 536-543.
Mnih et al., "Human-level control through deep reinforcement learning," Nature, Feb. 26, 2015, 518:529-533.
Mnih, et al., "Asynchronous Methods for Deep Reinforcement Learning," Proceedings of the 33rd International Conference on Machine Learning, 2016, pp. 1928-1937.
Moulin et al., "Strategically zero-sum games: the class of games whose completely mixed equilibria cannot be improved upon," International Journal of Game Theory, Sep. 1978, 7(3-4):201-221.
Muller et al., "A Generalized Training Approach for Multiagent Learning," CoRR, Sep. 27, 2019, arxiv.org/abs/1909.12823, 35 pages.
Nash, "Non-cooperative games," Annals of Mathematics, Sep. 1951, 54(2):286-295.
Omidshafiei et al., "U-rank: Multi-agent evaluation by evolution," Scientific Reports, Jul. 9, 2019, 9(1):9937.
Ortiz et al., "Maximum entropy correlated equilibria," Proceedings of the Eleventh International Conference on Artificial Intelligence and Statistics, Mar. 21-24, 2007, 2:347-354.
Rashid et al., "Estimating U-rank by maximizing information gain," Proceedings of the AAAI Conference on Artificial Intelligence, May 18, 2021, 35:5673-5681.
Rowland et al., "Multiagent evaluation under incomplete information," Advances in Neural Information Processing Systems 32, 2019, 13 pages.
Schrittwieser et al., "Mastering atari, go, chess and shogi by planning with a learned model," CoRR, Feb. 21, 2020, arxiv:1911. 08265v2, 21 pages.
Silver et al., "Mastering the game of go with deep neural networks and tree search," Nature, Jan. 28, 2016, 529(7587):484-489.
Smith et al., "Learning to play against any mixture of opponents," CoRR, Jun. 3, 2021, arXiv.2009.14180, 15 pages.
Srinivasan et al., "Actor-Critic Policy Optimization in Partially Observable Multiagent Environments," Advances in Neural Information Processing Systems 31, 2018, 14 pages.
Sundararajan et al., "Axiomatic attribution for deep networks," Proceedings of the 34th International Conference on Machine Learning, 2017, 70:3319-3328.
Turocy, "A dynamic homotopy interpretation of the logistic quantal response equilibrium correspondence," Games and Economic Behavior, May 2005, 51(2):243-263.
Tuyls et al., "Bounds and dynamics for empirical game theoretic analysis," Agents Multi Agent Syst., Dec. 4, 2019, 34:7.
Vinyals et al., "Grandmaster level in starcraft ii using multi-agent reinforcement learning," Nature, Oct. 30, 2019, 575:350-354.

(56) References Cited

OTHER PUBLICATIONS

Walsh et al., "Analyzing complex strategic interactions in multiagent systems," American Association for Artificial Intelligence, 2002, 10 pages.
Wellman, "Methods for empirical game-theoretic analysis," Proceedings the Twenty-First National Conference on Artificial Intelligence and the Eighteenth Innovative Applications of Artificial Intelligence Conference, Jul. 16-20, 2006, pp. 1552-1556.
Whitney et al., "Decoupled exploration and exploitation policies for sample-efficient reinforcement learning," CoRR, Jul. 1, 2021, arXiv. 2101.09458, 19 pages.
Zhang et al., "Automatic curriculum learning through value disagreement," CoRR, Jun. 17, 2020, arXiv.2006.09641, 14 pages.
Zhang et al., "Multi-Agent Reinforcement Learning: A Selective Overview of Theories and Algorithms," Handbook of Reinforcement Learning and Control, Jun. 24, 2021, pp. 321-384.

\* cited by examiner

RATING TASKS AND POLICIES USING CONDITIONAL PROBABILITY DISTRIBUTIONS DERIVED FROM EQUILIBRIUM-BASED SOLUTIONS OF GAMES

CROSS-REFERENCE TO RELATED APPLICATION

This application claims priority to U.S. Provisional Application No. 63/253,821, filed on Oct. 8, 2021. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a rating system implemented as computer programs on one or more computers in one or more locations that can rate action selection policies, tasks, or both.

An action selection policy can be used to select an action to be performed at each time step in a sequence of time steps as an agent interacts with an environment to accomplish a task. In particular, an action selection policy can define a procedure for processing data characterizing a current state of an environment (i.e., an "observation") to generate a policy output for selecting an action to be performed by the agent in response to the current state of the environment. The policy output can include, for example, a respective score for each action in a set of possible actions that can be performed by the agent, and the action associated with the highest score can be selected to be performed by the agent. As another example, the policy output can define a probability distribution over possible actions that can be sampled from to select actions to be performed by the agent.

An action selection policy can be implemented as a neural network, referred to as an "action selection neural network," that is configured to process an input that includes an observation of an environment to generate a policy output for selecting an action to be performed by an agent, e.g., to perform a task in the environment. An action selection neural network can have any appropriate neural network architecture that enables it to perform its described function, i.e., processing an observation to generate a policy output. In particular, an action selection neural network can include any appropriate types of neural network layers (e.g., fully-connected layers, convolutional layers, attention layers, etc.) in any appropriate numbers (e.g., 5 layers, 25 layers, or 100 layers) and connected in any appropriate configuration (e.g., as a linear sequence of layers). The action selection neural network may be part of an action selection system that includes other neural networks, e.g., an actor-critic reinforcement learning system.

A "pool" of action selection policies refers to a collection of multiple action selection policies. Each action selection policy may be implemented as a respective action selection neural network, e.g., such that different action selection policies may be associated with action selection neural networks having different neural network architectures and/or different parameter values.

A "pool" of tasks refers to a collection of multiple tasks. For example, in the case of a mechanical agent interacting with a real-world environment, a pool of tasks may include tasks corresponding to one or more of: locating respective objects of interest in the environment, moving respective objects of interest to respective locations in the environment, physically manipulating respective objects of interest in the environment in respective ways, or navigating to respective destinations in the environment.

In some implementations, the rating system can be used to determine a respective rating for each action selection policy in a pool of action selection policies. The rating for each action selection policy can characterize a utility of the action selection policy in performing tasks from a pool of tasks.

Action selection policy ratings generated by the rating system can be used for any of a variety of purposes. A few example uses of action selection policy ratings generated by the rating system are described next.

In one example, the policy ratings can be used by a policy management system as "fitness scores" to facilitate population based managing and/or training. More specifically, the management system can maintain a pool of action selection policies, and at each of multiple iterations, the management system can update the pool of action selection policies based on a respective rating of each action selection policy.

The management system can update the pool of action selection policies at each iteration in a variety of possible ways. A few example techniques by which the management system can update the pool of action selection policies at an iteration are described next.

In some implementations, the management system can update the pool of action selection policies by removing one or more action selection policies. For example, the management system can remove one or more action selection policies associated with the lowest ratings from among the pool of action selection policies.

In some implementations, the management system can update the pool of action selection policies by "reproducing" one or more action selection policies in the pool of action selection policies. Reproducing an existing action selection policy refers to generating one or more new action selection policies based on an existing action selection policy, and then adding the new action selection policies to the pool of action selection policies.

The management system can generate a new action selection policy based on the existing action selection policy in any of a variety of ways. In one example, the existing action selection policy defines an existing action selection neural network. To generate a new action selection policy based on the existing action selection policy, the management system can instantiate a new action selection neural network having an architecture that is a modification of the architecture of the existing action selection neural network. The management system can modify the architecture of the existing action selection neural network to generate the new action selection neural network, e.g., by adding or removing one or more neural network layers from the existing action selection neural network or otherwise modifying hyperparameters of the existing action selection neural network (and then training the new action selection neural network).

After updating the pool of action selection policies, the rating system can generate a respective rating for each action selection policy in the updated pool of action selection policies, before advancing to the next iteration.

The management system can thus iteratively evolve the pool of action selection policies, using the ratings generated by the rating system, to encourage the generation of action selection policies associated with higher ratings, e.g., because such action selection policies may be particularly effective for performing tasks.

In another example, action selection policy ratings generated by the rating system can be used to identify a set of "best-performing" action selection policies from the pool of action selection policies. For example, a predefined number of action selection policies associated with the highest ratings from among the pool of action selection policies can be identified as best-performing action selection policies. The best-performing action selection policies can be maintained, while the remaining action selection policies from the pool of action selection policies can be discarded. Upon receiving a request to control an agent to perform a task in an environment, one of the best-performing action selection policies can be selected for use in selecting actions to be performed by the agent to cause the agent to accomplish the task.

In some implementations, the rating system can be used to determine a respective rating for each task in a pool of tasks, where the rating for a task characterizes a level of difficulty of the task for action selection policies in the pool of action selection policies. The "level of difficulty" of a task can characterize, e.g., the duration of time required for an agent to complete the task, the likelihood that an agent can complete the task, the relative performance of an agent on the task, or other metrics and/or combinations thereof.

The task ratings generated by the rating system can be used for any of a variety of purposes. For example, a policy training system can use the task ratings to select tasks for use in training an "input" action selection policy (which may be another action selection policy, e.g., of an action selection policy neural network system). Such an "input" action selection policy may be used for performing any of the tasks described herein. A few example techniques by which the training system can use the task ratings to select tasks for use in training an input action selection policy are described next.

In one example, the training system can determine a probability distribution over the pool of tasks based on the ratings of the tasks in the pool of tasks. For example, the training system can determine the probability distribution over the pool of tasks by processing the ratings for the tasks in the pool of tasks using a soft-max function. The training system can thereafter sample tasks from the pool of tasks for use in training the input action selection policy in accordance with the probability distribution over the pool of tasks. The training system can thus emphasize training the input action selection policy, e.g., on the most difficult tasks from the pool of tasks.

In another example, the training system can use the ratings of the tasks in the pool of tasks to select tasks of progressively higher levels of difficulty for use in training the input action selection policy. For example, the training system can determine an ordering of the tasks in the pool of tasks based on their ratings, e.g., the training system can order the tasks in order of increasing (or decreasing) rating, and by extension, in order of increasing level of difficulty. The training system can then train the input action selection policy on the tasks in the pool of tasks in accordance with the ordering of the tasks from the pool of tasks.

At each time step that an agent interacts with an environment to perform a task, the agent can receive a reward based on the current state of the environment and the action performed by the agent at the time step. Generally, the reward may be represented as a numerical value. The reward can be based on any event in or aspect of the environment. For example, the reward may indicate whether the agent has accomplished a task (e.g., navigating to a target location in the environment) or the progress of the agent toward accomplishing the task.

Training an action selection policy to perform a task can refer to adjusting the values of a set of action selection policy parameters to increase the performance of the action selection policy on the task. For example, for an action selection policy represented by an action selection neural network, the training system can train the action selection neural network to perform the task using a reinforcement learning technique, e.g., a Q learning technique or a policy gradient technique.

Training an action selection neural network using a reinforcement learning technique can refer to iteratively adjusting the parameter values of the action selection neural network to encourage an increase in a cumulative measure of rewards received by an agent performing actions selected using the action selection neural network, e.g., by backpropagating gradients of a reinforcement learning objective. The cumulative measure of rewards can be, for example, a time-discounted sum of rewards.

The techniques described herein can be applied to rate any appropriate agents and tasks. A few non-limiting examples of agents, environments, and tasks are described next for illustrative purposes.

In some implementations, the environment is a real-world environment and the agent is a mechanical agent interacting with the real-world environment, e.g., to perform a task. For example, the agent may be a robot or other mechanical agent interacting with the environment to accomplish a task, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment. Then the actions may be actions taken by the mechanical agent in the real-world environment to accomplish the task, and may include control signals to control the mechanical agent.

In these implementations, the observations may include, for example, one or more of images, object position data, and sensor data to capture observations as the agent interacts with the environment, for example sensor data from an image, distance, or position sensor or from an actuator.

In the case of a robot, the observations may include data characterizing the current state of the robot, e.g., one or more of: joint position, joint velocity, joint force, torque or acceleration, for example gravity-compensated torque feedback, and global or relative pose of an item held by the robot.

Moreover, in the case of a robot (or other mechanical agent) or vehicle, the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

The actions may be control inputs to control a robot or other mechanical agent, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example, in the case of an autonomous or semi-autonomous land, air, or sea vehicle the actions may include actions to control navigation, e.g., steering, and movement (e.g., braking and/or acceleration of the vehicle).

In some implementations, the environment is a simulated environment, e.g., a simulation of the above described real-world environment, and the agent is implemented as one or more computers interacting with the simulated environment.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example, the simulated environment may be a protein folding environment such that each state is a respective state of a protein chain and the agent is a computer system for determining how to fold the protein chain. In this example, the actions are possible folding actions for folding the protein chain and the task (goal) to be achieved may include, e.g., folding the protein so that the protein is stable and so that it achieves a particular biological function.

Generally, in the case of a simulated environment, the observations may include simulated versions of one or more of the previously described observations or types of observations and the actions may include simulated versions of one or more of the previously described actions or types of actions.

In the case of an electronic agent, the observations may include data from one or more sensors monitoring part of a plant or service facility, or a data center or grid mains power or water distribution system, such as current, voltage, power, temperature and other sensors and/or electronic signals representing the functioning of electronic and/or mechanical items of equipment. For example, observations of the state of the environment may then include any electronic signals representing the functioning of electronic and/or mechanical items of equipment. For example, a representation of the state of the environment may be derived from observations made by sensors sensing a state of the plant or service facility, e.g., sensors sensing a state or configuration of machines, devices, consumables, or products associated with the plant or service facility.

In such applications, the agent may control actions in a real-world environment including items of equipment, for example, in the data center or grid mains power or water distribution system, or in the manufacturing plant or service facility. The observations and task may then relate to operation of the plant or facility. For example, the observations may include observations of power or water usage by equipment, or observations of power generation or distribution control, or observations of usage of a resource or of waste production. The agent may control actions in the environment to accomplish the task (goal) of maintaining or increasing efficiency, for example, by reducing resource usage, and/or reduce the environmental impact of operations in the environment. This can include reducing waste, or by increasing output, e.g., power generated or supplied to the grid mains. The actions may include actions controlling or imposing operating conditions on items of equipment of the plant/facility, and/or actions that result in changes to settings in the operation of the plant/facility, e.g., to adjust or turn on/off components of the plant/facility.

The agent may include a control system configured to control the manufacture of a chemical, biological, or mechanical product by a manufacturing plant. The control system may be configured to control one or more of manufacturing units or machines in the manufacturing plant or to control movement of an intermediate version or component of the product between the manufacturing units or machines. A task performed by the agent may be to manufacture the product or an intermediate version or component thereof, or to control (e.g., minimize) use of a resource such as electrical power, or water, or any material or consumable used in the manufacturing process.

In some further applications, the environment is a real-world environment and the agent, e.g., a software agent (a computer program), manages a distribution of computing tasks across computing resources, e.g., on a mobile device, and/or in a data center, or over a network, or on one or more real-world servers. In these implementations, the observations may include observations of computing resources such as compute and/or memory capacity, or Internet-accessible resources, or of communications path bandwidths, or observations characterizing the performance of the computing tasks. The actions may include assigning computing tasks to particular computing resources, and the (overall) task or goal to be achieved can include minimizing the time required to complete a set of computing tasks using specified computing resources or, in general, to maximize or minimize one or more of: utilization of computing resources, electrical power, bandwidth, and computation speed. As a particular example, such a software agent can manage a queue of continuously arriving jobs, observing, e.g., times of departures of successive jobs, or time intervals between these, or the processing time for each job, or data characterizing the type of jobs. The actions may be to allocate particular jobs to particular computing resources, e.g., to minimize an individual or overall queueing or processing for one or more jobs, or in general to optimize any related metric. As another particular example, the task may be to reduce a risk of security vulnerability and the actions can control the distribution of computing tasks to perform a task based on any metric(s) characterizing desired operation of the computer system or network.

As a further example, the actions may include presenting advertisements, and the observations may include advertisement impressions or a click-through count or rate. In this example, the task to be achieved can include maximizing selections of items or content by the one or more users.

Another example application includes using a software agent to route interconnection lines in the environment of a circuit or of an integrated circuit observing, e.g., component positions and physical or electronic interconnect parameters, using placing and routing actions to perform a task, e.g., to optimize circuit operation to reduce electrical losses, local or external interference, or heat generation, or to increase operating speed, or to minimize or optimize usage of available circuit area; for making the circuit or integrated circuit to a specified design.

In some cases, the method and system can be used in the simulated environment to generate the respective ratings for the tasks, and then can be used to train an action selection policy, e.g., of an action selection neural network, based on interactions of an agent with a simulated environment, e.g., using one or more tasks selected based on the ratings. After the action selection policy is trained based on interactions of the agent with the simulated environment, the agent can be deployed in a real-world environment, and the action selection policy can be used to control interaction of the agent with the real-world environment. Training the action selection policy based on interaction of the agent with a simulated environment (i.e., instead of a real-world environment) can avoid wear-and-tear on the agent and can reduce the likelihood that, by performing poorly chosen actions, the agent can damage itself or aspects of its environment.

Optionally, in any of the above implementations, the observation at any given time step may include data from a previous time step that may be beneficial in characterizing the environment, e.g., the action performed at the previous time step, the reward received at the previous time step, and so on.

The subject matter described in this specification can be implemented in particular embodiments so as to realize one or more of the following advantages.

The rating system described in this specification can determine a respective rating for each action selection policy in a pool of action selection policies, where the rating for an action selection policy characterizes a utility of the action selection policy in performing tasks from a pool of tasks. The rating system can determine the ratings for the action selection policies based on an equilibrium-based solution of a game. Such a game can be a so-called "normal-form game", e.g., derived from an empirical game.

A game can have "players", for example, implemented as functions in computer program code, e.g., by a game engine, that play the game by taking player actions according to respective player strategies in order to obtain a respective payoff. A game need not have a result (i.e., it need not have a defined end point); in general, a player's objective is to maximize their payoff in the presence of other players, who are also maximizing their own payoffs.

Thus the game may be defined by performance measures of the action selection policies on the tasks, which can define respective payoffs for the players. Any suitable performance measures can be used, e.g., a performance measure can be based on rewards received by an agent performing a task according to an action selection policy for the agent. That is, the game can be defined by the performance measures for the action selection policies on the tasks for each action selection policy-task pair. "Playing" the game is a way of determining the performance measures (and the associated payoffs of each player) that define the game; it need not involve, for example, turn-taking or any particular strategy for an individual player. Hence, in general, the game can be defined by a collection of payoffs for each player, where the payoffs are associated with the performance measures of all possible action selection policy-task pair.

A joint probability distribution over the set of action selection policy-task pairs can be determined from the respective payoffs of the players, in particular based on an equilibrium-based solution of the game. A joint distribution resulting from an equilibrium-based solution of the game generally describes joint strategies between the players when their objectives are to maximize their respective payoffs in the presence of other players. The payoffs can be chosen to encourage various strategies, e.g., competing or cooperating strategies. For example, in a competing strategy, the payoffs can be implemented as zero-sum such that maximizing one player's payoff minimizes another, and vice versa.

In some implementations, the performance measures that define the game can be determined in a simulation of a real environment, using a simulation of a real-world agent, as described above, and then the corresponding ratings can be used, or refined then used, in a real-world system, e.g., to select or train an action selection neural network to perform actions in the real world in response to real-world observations, as described above.

A "solution" of the game can be defined by a so-called "solution concept"; the solution can represent (or define) the set of player strategies adopted by the players, where a strategy can be to select a particular action selection policy or task. A "solution" can be characterized by the joint probability distribution. An equilibrium-based solution of a game can be a solution, i.e., a joint probability distribution, that represents a set of player strategies that is in equilibrium, i.e., where there is no incentive for the players to deviate from their respective strategies, more precisely, where no player has an incentive to unilaterally deviate from the joint distribution to achieve a better payoff.

In general, the joint probability distribution can be found by determining an equilibrium-based solution of the game defined by the performance measures. There are many algorithms for obtaining such an equilibrium solution numerically (i.e., so that no player has an incentive to deviate), typically by optimizing an objective appropriate to the type of equilibrium; there are many types of objective that can be used, e.g., maximum entropy, maximum Gini coefficient, maximum welfare, etc. Some examples are described later. Thus, in implementations where the joint probability distribution is an equilibrium-based solution of a game, the joint probability distribution can be one for which there is no incentive to deviate from the distribution in a game in which players select action selection policies and tasks and receive payoffs that depend on the performance measures of the action selection policies on the tasks.

There can be many types of equilibrium, e.g., a "Nash equilibrium", a "correlated equilibrium", and a "coarse-correlated equilibrium". The equilibrium may be approximate, that is, can be parameterized by an approximation parameter ($\epsilon$) that characterizes a permitted deviation from equilibrium, e.g., that defines a maximum allowed incentive to deviate to a best response (across all players).

In some example implementations, the game can be implemented by a game system where a first player selects an action selection policy and a second player selects a task. The respective payoff received by each player is based on the performance measures of the selected action selection policy on the selected task. In a competing game, the first player can be understood to attempt to select an action selection policy that will perform well on the task selected by the second player, while the second player attempts to select a task that will be performed poorly by the action selection policy selected by the first player.

These approaches are not limited to two-player games and the techniques described herein can be used with N-players where N>2. For example, the described techniques can be used in a multi-agent setting where the action selection policies of two or more agents can interact whilst performing one or more tasks and each agent can correspond to a different player.

The rating system can determine a respective rating for each action selection policy in a pool of action selection policies using an equilibrium-based solution of a game. The game, and the equilibrium-based solution, can be as described above, e.g., the game can be a normal-form game (which may be derived from an empirical game). As described above, the game may be defined by performance measures of the action selection policies on the tasks. The game can be implemented by the game system where a first player selects an action selection policy and a second player selects a task, as described above.

By determining action selection policy ratings using an equilibrium-based solution of the game, the rating system can determine ratings that better reflect the utility of action selection policies. For example, compared to a conventional system, the rating system may determine a higher rating for a "niche" action selection policy that is specialized for performing a "niche" subset of tasks from the pool of tasks, but is less effective for the remaining tasks in the pool of tasks. This reflects that the niche action selection policy that is specialized to perform the niche tasks may be valuable, in the context of the game, by providing the first player with a particularly effective counter to the selection of the niche tasks by the second player. In contrast, a conventional system may determine the rating for an action selection policy by averaging the performance of the action selection policy across the pool of tasks, which would result in a low rating for the niche action selection policy.

The policy management system can use the rating system, e.g., to rate the action selection policies in a pool of action selection policies as part of iteratively evolving the pool of action selection policies during population based training. Rating action selection policies using the rating system can enable the management system to evolve action selection policies that achieve an acceptable level of task performance over fewer iterations than would otherwise be necessary, e.g., by maintaining useful niche action selection policies in the pool of policies. The rating system can thus enable reduced consumption of computational resources, e.g., memory and computing power, during population based training.

Alternatively or in addition, the rating system can determine a respective rating for each task in a pool of tasks using an equilibrium-based solution of a game. By determining task ratings using an equilibrium-based solution of the game, the rating system can determine ratings that better reflect the difficulty of tasks. For example, compared to a conventional system, the rating system may determine a higher rating for a "niche" task that is particularly difficult for a subset of action selection policies from the pool of action selection policies, but is less difficult for the remaining action selection policies. This reflects that the niche task may be valuable, in the context of the game, by providing the second player with a particularly effective counter to the selection of certain action selection policies by the first player. In contrast, a conventional system may determine the rating for a task by averaging the performance of action selection policies from across the pool of action selection policies on the task, which would result in a low rating for the niche task.

The policy training system can use the rating system, e.g., to rate tasks in a pool of tasks, and then use the task ratings for selecting tasks for use in training an "input" action selection policy. For example, the training system may use the task ratings to select tasks of progressively higher levels of difficulty for training the input action selection policy, thus facilitating learning of effective strategies by the action selection policy. As another example, the training system may use the task ratings to select difficult tasks for use in training the input action selection policy, thus increasing the likelihood that the input action selection policy learns schemes to solve difficult tasks. By using the task ratings to select tasks for use in training an action selection policy, the training system can train the action selection policy to achieve an acceptable level of performance over fewer training iterations and using less training data, thus reducing consumption of computational resources during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
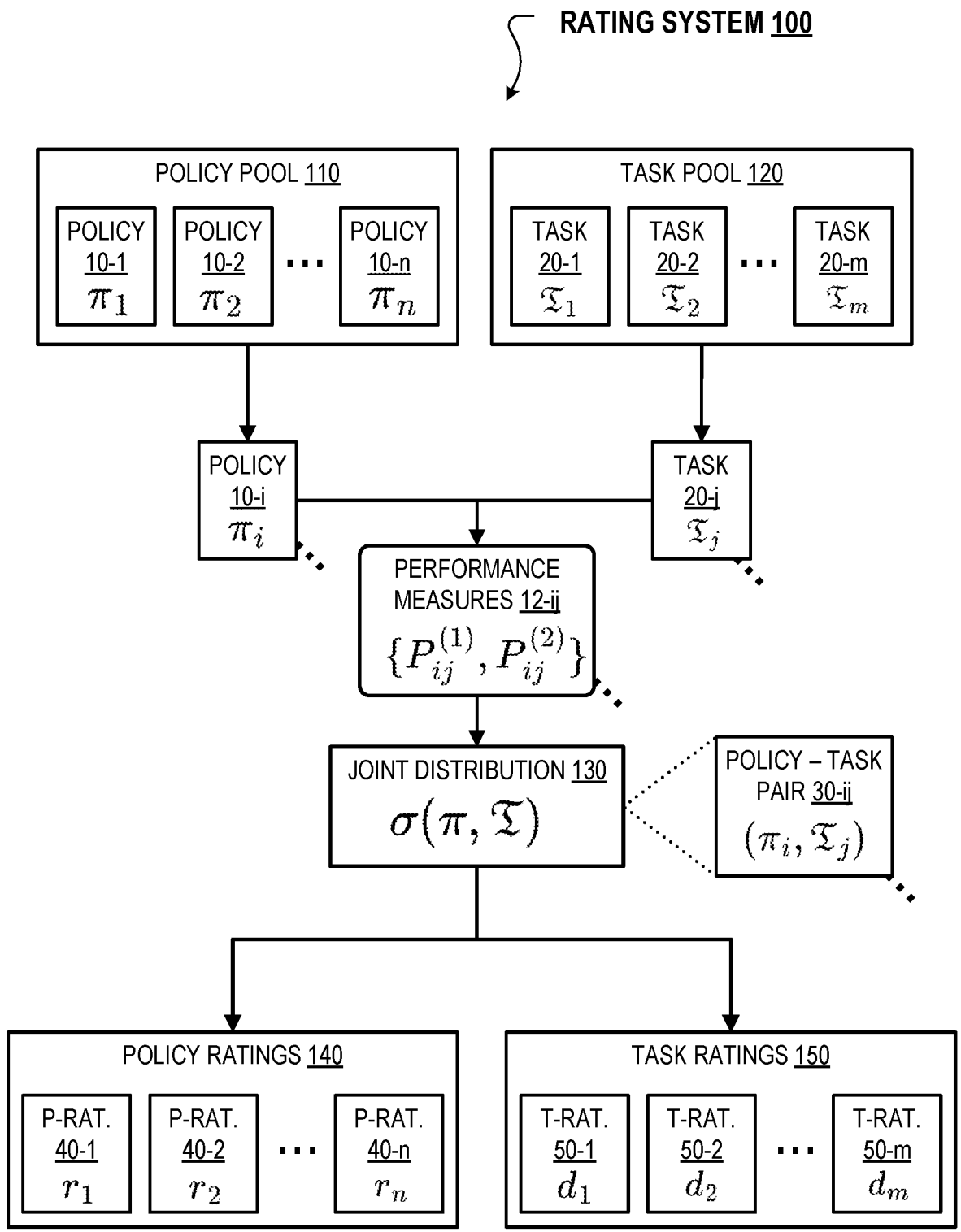
FIG. 1 is a block diagram of an example rating system.

Rating strategies in a game can be a useful application of game theory and artificial intelligence, a procedure that can be applied to any real-world competitive or cooperative setting. Traditionally, rating systems assume transitive dependencies of strategies in a game (e.g., Elo and TrueSkill). That is, there exists an unambiguous ordering of all strategies according to their relative strengths. This ignores all other interesting interactions between strategies, including cycles where strategy S beats P beats R beats S in the classic game of Rock, Paper, Scissors (RPS). Many interesting games have this so-called "strategic" dimension that cannot be captured by pairwise transitivity constraints.

Game theoretic rating of strategies as disclosed in this specification can overcome some, or all, of these drawbacks. These methods can be employed in normal-form games and normal-form constructed empirical games. The latter is generally referred to as empirical game theory analysis (EGTA) and can facilitate normal-form game representations from observations of much larger systems. For example, an empirical game can be implemented in normal-form where strategies are policies competing in a multi-agent interaction (e.g., a simulation or a game) and the payoffs are approximate expected returns of players employing these policies. This can occur in artificial intelligence when studying a set of policies in large extensive form games. The set of policies can be too large to enumerate entirely so a subset is retained and their performance tracked against one another, therefore constructing a normal-form game from the policies' expected returns within the environment.

However, due to the complexity of such games, a robust, consistent and unambiguous means of applying game theoretic techniques to rate policies has remained elusive. The problem is compounded when considering their utility on specific tasks in an environment and characterizing the relative significance and/or difficulty of the tasks. Standard rating procedures take the average performance of a policy on all tasks and the average difficulty of a task as exhibited by all policies. The key drawback of this approach is that it is biased heavily on the distribution of opposing policies and/or tasks. For example, if a pool of tasks has a large set of similar (e.g., redundant) tasks and a small set of "niche" tasks, a policy that performs well on the similar tasks would conventionally be rated more favorably than a policy that performs well on a niche task, despite the policy being situationally valuable. Standard rating procedures cannot discern when a task is redundant, if the policies are tested on tasks in an intuitive manner, what policies or tasks matter most, or how either of them should be evaluated in an unbiased fashion.

The game theoretic rating methods disclosed herein can solve these persistent difficulties. The methods enable game theoretic solution concepts, such as equilibria, to be leveraged efficiently to rate policies and tasks in games with complex strategic interactions, which often arise in multi-agent training and real-world interactions between many agents.

These abovementioned features and other features are described in more detail below.

FIG. 1 shows an example of a rating system 100 that can assign ratings to policies and tasks. Note, ranking is the problem of assigning a partial ordering to a set. Rating is the more general problem of assigning a scalar value to each element of a set, which can then be used to describe a ranking, e.g., to order or partially order the set based on the ratings. Rating system 100 is concerned with the more general problem of rating. The rating system 100 is an example of a system implemented as computer programs on one or more computers in one or more locations in which the systems, components, and techniques described below are implemented.

Rating system 100 operates on a pool of action selection policies 110. A "pool" of action selection policies 110 refers to a collection of multiple action selection policies 10-1 . . . n. In this case, the policy pool 110 can be represented concisely as a set of n policies $\Pi=\{\pi_1, \pi_2, \ldots, \pi_n\}$. Each action selection policy 10-1 . . . n may be implemented as a respective action selection neural network, e.g., such that different policies may be associated with neural networks having different neural network architectures and/or different parameter or hyperparameter values.

An action selection policy $\pi_i \in \Pi$ can be used to select an action (a) to be performed at each time step in a sequence of time steps as an agent interacts with an environment to accomplish a task. In particular, a policy can define a procedure for processing data characterizing a current state(s) of an environment (e.g., an "observation" (o) of the environment) to generate a policy output for selecting an action to be performed by the agent in response to the current state of the environment, i.e., $a \sim \pi_i(\cdot|o)$. Note that the observation $o \leftarrow s$ may not contain all the information of the state, or it may contain distorted information of the state, or combinations thereof. Thus, the policy $\pi_i$ selects actions a based on the available information, which may or may not be complete. For example, the current state s may correspond to a position and orientation of a person, but the observation o is made on a shadow of the person.

Rating system 100 also operates on a pool of tasks 120. A "pool" of tasks refers to a collection of multiple tasks 20-1 . . . m. Similar to the policy pool 110, the task pool 120 can be represented concisely as a set of m tasks $T=\{\mathcal{T}_1, \mathcal{T}_2, \ldots, \mathcal{T}_m\}$.

A task $\mathcal{T}_j \in T$ may refer to a general Markov decision process (MDP) that the agent uses within the environment to achieve a goal. Although various realizations are possible, MDPs provide a convenient semantic definition of tasks. For example, a task $\mathcal{T}_j$ can include a state space $\mathcal{S}_j$ and an action space $\mathcal{A}_j$ corresponding to a particular set of states of the environment and a particular set of actions that can be performed in the environment, respectively. The state space and/or action space can be finite or infinite depending on the particular task.

The task $\mathcal{T}_j$ can include an initial state distribution $p_j(s_0)$ that characterizes the start of the task with respect to an initial state of the environment $(s_0)$. For example, the task may be partially completed or may be more difficult to complete depending on the initial state $s_0$. The dynamics throughout completion of the task $\mathcal{T}_j$ can be described by a state transition function $p_j(s'|s, a)$ that determines the probability of transitioning to a new state s' given a current state s and an action a. That is, at each time step the agent interacts with the environment to accomplish the task, the state transition function determines the probability of transitioning to s' given the action a selected due to s, e.g., as selected from an action selection policy $a \sim \pi_i(\cdot|o)$ in response to an observation of the current state $o \leftarrow S$.

The task $\mathcal{T}_j$ can include a reward $R_j(s'|s, a)$ for transitioning to the state s' given the action a selected due to s. The reward is generally a numerical value that characterizes performance of the agent attempting to complete the task $\mathcal{T}_j$ at the particular time step. To motivate completion of the task with early actions, the task $\mathcal{T}_j$ can also include a discount factor $0 \le \gamma_j \le 1$. Summarizing, performance of a task $\mathcal{T}_j$, described by a MDP, can be associated with a 6-tuple:

$$\mathcal{T}_j=\{\mathcal{S}_j, \mathcal{A}_j, p_j(s_0), p_j(s'|s,a), R_j(s'|s,a), \gamma_j\}$$

Note that the number of policies n in the policy pool 110 and the number of tasks m in the task pool 120 do not need to be equal n≠m. As will be described with respect to FIG. 7, the policy pool 110 can be updated based on respective ratings assigned to the policies. The rating system 100 can subsequently execute on the updated policy pool 110 to generate new ratings for the policies and tasks.

The rating system 100 rates policies 10-1 ... n and tasks 20-1 ... m by determining performance measures $\{P_{ij}^{(1)}, P_{ij}^{(2)}\}$ 12-ij for each policy $\pi_i \in \Pi$ in the policy pool 110 on each task $\mathcal{T}_j \in T$ in the task pool 120. In general, the performance measure associated with the policy $P_{ij}^{(1)}$ and the performance measure associated with the task $P_{ij}^{(2)}$ do not need to be equal $P_{ij}^{(1)} \neq P_{ij}^{(2)}$ and they can characterize different properties. For example, $P_{ij}^{(1)}$ can characterize how well the task was completed and $P_{ij}^{(2)}$ can characterize the total duration of time necessary to complete the task. Hence, although the policy $\pi_i$ may be capable of accomplishing the task $\mathcal{T}_j$ and therefore has utility, the task $\mathcal{T}_j$ may still be difficult since it involves a relatively large number of time steps. Considering tasks represented as MDPs as above, the policy performance measure $P_{ij}^{(1)}$ can be characterized by an expected return, e.g., an expected discounted sum of rewards, when actions $a_t$ are selected from the policy $\pi_i$ to accomplish the task $\mathcal{T}_j$ in response to observations $o_t$ of the environment at each time step t={0, 1, 2, ..., T}:

$$P_{ij}^{(1)} = E\left[\sum_{t=0}^{T} \gamma_j^t R_j(s_{t+1}|s_t, a_t)\right], \; a_t \sim \pi_i(\cdot|o_t)$$

Similarly, the task performance measure $P_{ij}^{(2)}$ can be characterized by the total number of time steps $P_{ij}^{(2)}=T$.

As another example, if the performance measures 12-ij are "adversarial", they can be implemented as zero-sum $P_{ij}^{(1)}=-P_{ij}^{(2)}$, meaning a high utility policy $\pi_i$ corresponds to a low difficulty task $\mathcal{T}_j$ for that specific policy-task pair, and vice versa. In this case, the total duration of time for the policy $\pi_i$ to complete the task $\mathcal{T}_j$ may not be a desirable metric. However, in general, the performance measures $\{P_{ij}^{(1)}, P_{ij}^{(2)}\}$ can encompass any desired metrics of policies attempting to accomplish tasks.

Rating system 100 processes the performance measures 12-i ... nj ... m to generate a joint probability distribution $\sigma(\pi, \mathcal{T})$ 130 over a set of action selection policy-task pairs $(\pi_i, \mathcal{T}_j)$ 30-ij. The joint distribution 130 corresponds to an n×m matrix of probabilities $\sigma(\pi_i, \mathcal{T}_j)$ for each policy-task pair $(\pi_i, \mathcal{T}_j)$ 30-ij. Hence, the joint distribution 130 provides the probability of every possible pair of policies 10-1 ... n in the policy pool 110 and tasks 20-1 ... m in the task pool 120. As will be explained with respect to FIG. 5, the joint distribution 130 can be derived from an equilibrium-based solution of a game.

The joint distribution 130 encodes the marginal distributions over the set of policies $\sigma(\pi)$ and the set of tasks $\sigma(\mathcal{T})$. The marginal policy distribution $\sigma(\pi)$ corresponds to an n-dimensional array of probabilities $\sigma(\pi_i)$ for each of the policies $\pi_i$ in the policy pool 110. The marginal task distribution $\sigma(\mathcal{T})$ corresponds to an m-dimensional array of probabilities $\sigma(\mathcal{T}_j)$ for each of the tasks $\mathcal{T}_j$ in the task pool 120. The marginals can be found from the joint distribution 130 as, $$\sigma(\pi_i) = \sum_j \sigma(\pi_i, \mathcal{T}_j), \; \sigma(\mathcal{T}_j) = \sum_i \sigma(\pi_i, \mathcal{T}_j)$$

Note, the joint distribution 130 and the marginals have the property of summing to unity:

$$\sum_i \sigma(\pi_i) = \sum_j \sigma(\mathcal{T}_j) = \sum_{ij} \sigma(\pi_i, \mathcal{T}_j) = 1$$

From left to right, the above equation ensures the probability of selecting at least one policy is 1, the probability of selecting at least one task is 1, and the probability of selecting at least one policy-task pair is 1.

The joint distribution 130 also encodes the conditional probabilities which determine how the tasks $\mathcal{T}_j$ are distributed when given information (conditioned) on the policies $\pi_i$, and vice versa, $$\sigma(\mathcal{T}_j|\pi_i) = \frac{\sigma(\pi_i, \mathcal{T}_j)}{\sigma(\pi_i)}, \; \sigma(\pi_i|\mathcal{T}_j) = \frac{\sigma(\pi_i, \mathcal{T}_j)}{\sigma(\mathcal{T}_j)}$$

$\sigma(\mathcal{T}_j|\pi_i)$ is the probability of $\mathcal{T}_j$ given $\pi_i$ and $\sigma(\pi_i|\mathcal{T}_j)$ is the probability of $\pi_i$ given $\mathcal{T}_j$.

Rating system 100 processes the joint distribution 130 over the set of policy-task pairs 30-i ... nj ... m to generate a respective policy rating 40-i for each policy 10-i in the policy pool 110. The policy rating $r_i$ characterizes a utility of the action selection policy $\pi_i$ in performing tasks 20-1 ... m from the task pool 120.

Figure 2A:
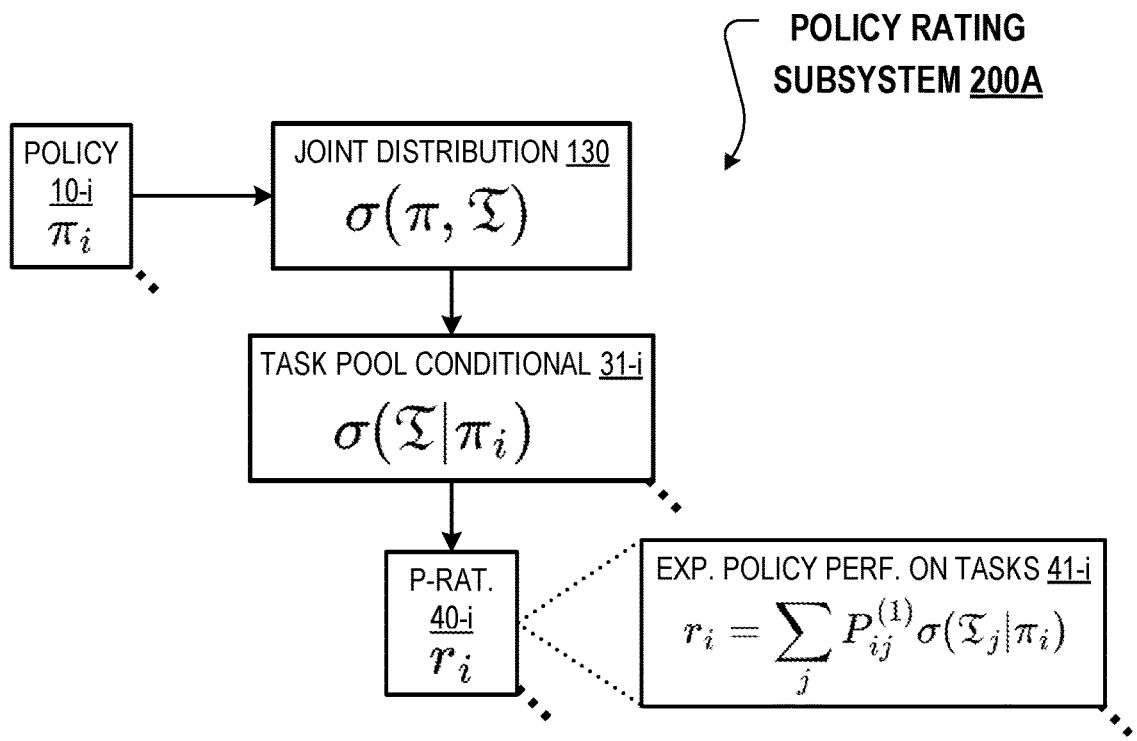
FIG. 2A is a block diagram of an example policy rating subsystem.

Referring to FIG. 2A, a policy rating subsystem 200A of the rating system 100 can determine the policy rating 40-i for each policy 10-i. The policy rating subsystem 200A conditions the joint distribution 130 on the policy $\pi_i$ 10-i to generate a conditional probability distribution over the task pool $\sigma(\mathcal{T}|\pi_i)$ 31-i. The task pool conditional 31-i corresponds to an m-dimensional array of conditional task probabilities $\sigma(\mathcal{T}_j|\pi_i)$ conditioned on the given policy $\pi_i$. To determine the policy rating $r_i$, policy rating subsystem 200A determines an expected value of a performance measure 41-i of the given policy $\pi_i$ on the task pool 120 when the tasks are selected in accordance with the task pool conditional 31-i:

$$r_i = \frac{\partial}{\partial \sigma(\pi_i)} \sum_{ij} P_{ij}^{(1)} \sigma(\pi_i, \mathcal{T}_j) = \sum_j P_{ij}^{(1)} \sigma(\mathcal{T}_j|\pi_i)$$

Repeating the process for each policy $\pi_i$ in the policy pool 110, the rating system 100 generates a set of policy ratings 140 containing n policy ratings $\mathcal{R}=\{r_1, r_2, \ldots, r_n\}$.

The above equation has at least two interpretations: i) the change in the policy's performance on the tasks under a joint distribution, $\Sigma_{ij} P_{ij}^{(1)} \sigma(\pi_i, \mathcal{T}_j)$, with respect to the probability of selecting that policy $\sigma(\pi_i)$, and ii) the expected policy performance on the tasks under a joint distribution conditioned on that policy $\pi_i$. When implemented as above, the policy rating $r_i$ is bounded between the minimum and maximum values of the policy's performance on any one task, min $\{P_{ij=1 \ldots m}^{(1)}\} \leq r_i \leq$ max $\{P_{ij=1 \ldots m}^{(1)}\}$. This method of rating policies has a number of benefits. For example, if the policy $\pi_i$ performs well on many similar tasks but poorly on a niche task, the policy rating $r_i$ takes into account the poor performance on the niche task which, as mentioned previously, would generally be ignored by traditional rating algorithms.

Rating system 100 can order (or partially order) the policy ratings 40-1 . . . n in the set of policy ratings 140 based on some criteria to determine a relative ranking of each policy 10-1 . . . n. For example, the rating system 100 can order the policy ratings 40-1 . . . n from least to greatest values corresponding to the least to greatest utility of each policy 10-1 . . . n on the tasks 20-1 . . . m.

Alternatively or in addition, rating system 100 processes the joint distribution 130 over the set of policy-task pairs 30-i . . . nj . . . m to generate a respective task rating 50-j for each task 20-j in the task pool 120. The task rating $d_j$ characterizes a level of difficulty of the task $\mathcal{T}_j$ for action selection policies 10-1 . . . n in the policy pool 110.

Figure 2B:
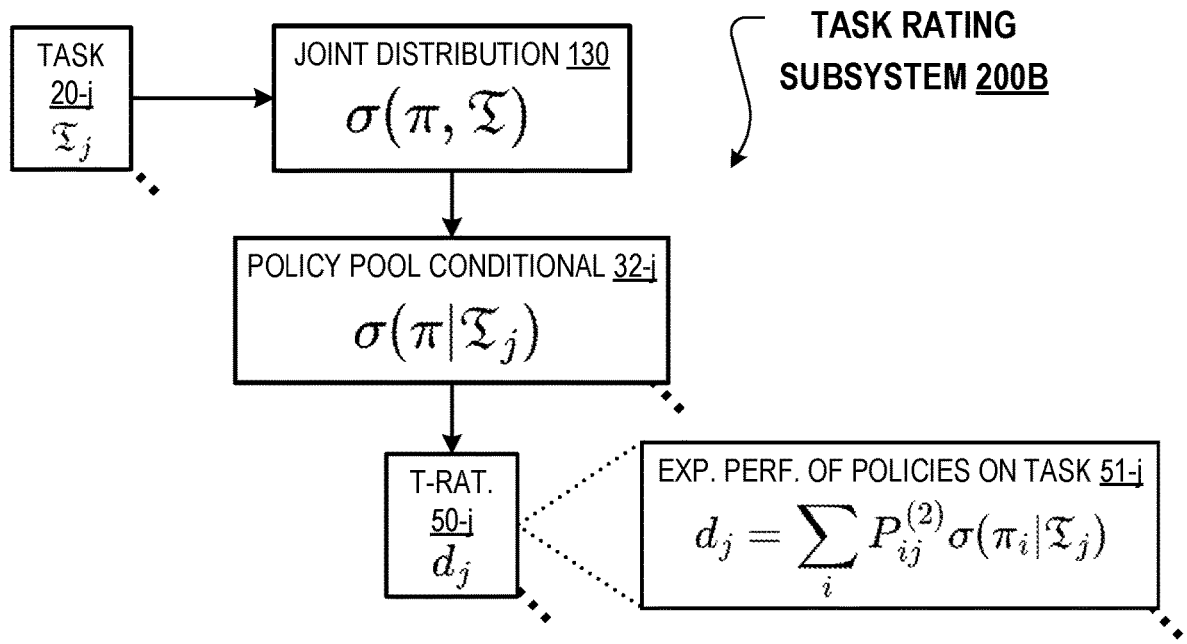
FIG. 2B is a block diagram of an example task rating subsystem.

Referring to FIG. 2B, a task rating subsystem 200B of the rating system 100 can determine the task rating 50-j for each task 20-j. The task rating subsystem 200B conditions the joint distribution 130 on the task $\mathcal{T}_j$ 20-j to generate a conditional probability distribution over the policy pool $\sigma(\pi|\mathcal{T}_j)$ 32-j. The policy pool conditional 32-j corresponds to an n-dimensional array of conditional policy probabilities $\sigma(\pi_i|\mathcal{T}_j)$ conditioned on the given task $\mathcal{T}_j$. To determine the task rating $d_j$, task rating subsystem 200B determines an expected value of a performance measure 51-j of policies in the policy pool 110 on the given task $\mathcal{T}_j$ when the policies are selected in accordance with the policy pool conditional 32-j:

$$d_j = \frac{\partial}{\partial \sigma(\mathcal{T}_j)} \sum_{ij} P_{ij}^{(2)} \sigma(\pi_i, \mathcal{T}_j) = \sum_i P_{ij}^{(2)} \sigma(\pi_i|\mathcal{T}_j)$$

Repeating the process for each task $\mathcal{T}_j$ in the task pool 120, the rating system 100 generates a set of task ratings 150 containing m task ratings $\mathcal{D} = \{d_1, d_2, \ldots, d_m\}$.

The above equation has at least two interpretations: i) the change in the policies' performance on the task under a joint distribution, $\Sigma_{ij} P_{ij}^{(2)} \sigma(\pi_i, \mathcal{T}_j)$, with respect to the probability of selecting that task $\sigma(\mathcal{T}_j)$, and ii) the expected performance of policies on the task under a joint distribution conditioned on that task $\mathcal{T}_j$. When implemented as above, the task rating $d_j$ is bounded between the minimum and maximum values of any one policy's performance on the task, min $\{P_{i=1 \ldots nj}^{(2)}\} \leq d_j \leq$ max $\{P_{i=1 \ldots nj}^{(2)}\}$. This method of rating tasks has a number of benefits. For example, if a niche task $\mathcal{T}_j$ is difficult to accomplish by many policies but relatively easy by one policy, the task rating $d_j$ takes into account the good performance of the one policy on the task which, reiterating, would generally be ignored by traditional rating algorithms.

Rating system 100 can order (or partially order) the task ratings 50-1 . . . m in the set of task ratings 150 based on some criteria to determine a relative ranking of each task 20-1 . . . m. For example, the rating system 100 can order the task ratings 50-1 . . . m from least to greatest values corresponding to the least to most difficult tasks 20-1 . . . m for the policies 10-1 . . . n.

Note the mathematical edge case that one or more policies and/or tasks have zero marginal probability, i.e., $\sigma(\pi_i)=0$ and/or $\sigma(\mathcal{T}_j)=0$, corresponding to undefined conditional distributions $\sigma(\mathcal{T}|\pi_i)$ and/or $\sigma(\pi|\mathcal{T}_j)$, and therefore undefined ratings $r_i$ and/or $d_j$. In this case, a full set of ratings can be realized by three different procedures, or combinations thereof: i) using a game theoretic equilibria (see FIG. 5) as certain joint distributions 130 are guaranteed to place at least some marginal probability on all policies and tasks (e.g., maximum entropy selected coarse-correlated equilibria), ii) assign $r_i$ and/or $d_j$ to their respective minimum or maximum possible values for undefined conditionals, or iii) rate using a sub-game equilibria with any dominating policies and/or tasks pruned. As will be seen in the following, option i) can be particularly advantageous.

Figure 3:
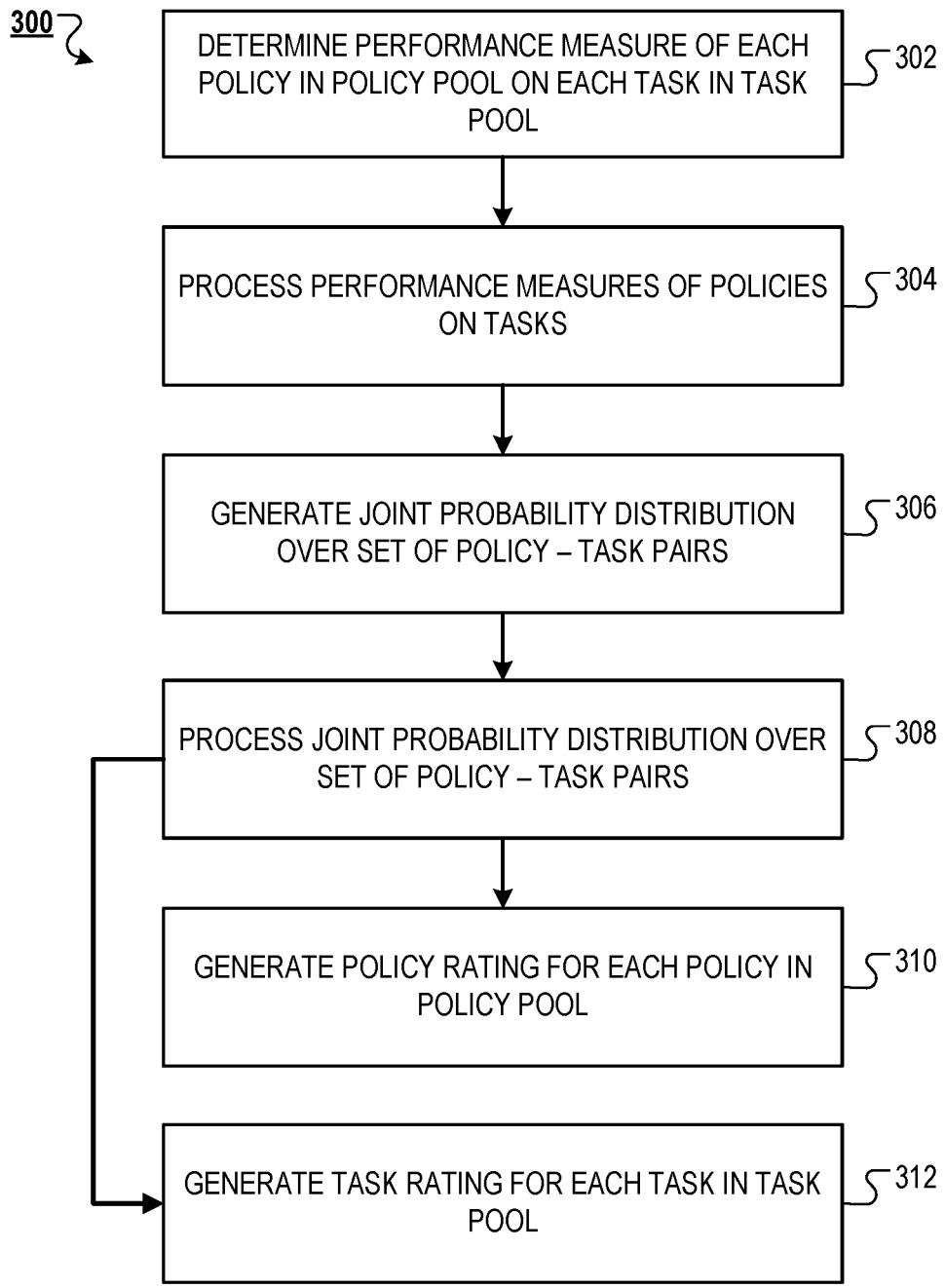
FIG. 3 is a flow diagram of an example process for rating policies and tasks.

FIG. 3 shows an example process 300 for assigning ratings to policies and tasks. For convenience, the process 300 will be described as being performed by a system of one or more computers located in one or more locations. For example, a rating system, e.g., the rating system 100 of FIG. 1, appropriately programmed in accordance with this specification, can perform the process 300.

Rating system determines performance measures $\{P_{ij}^{(1)}, P_{ij}^{(2)}\}$ of each action selection policy $\pi_i$ in a pool of action selections policies $\Pi = \{\pi_1, \pi_2, \ldots, \pi_n\}$ on each task $\mathcal{T}_j$ in a pool of tasks $T = \{\mathcal{T}_1, \mathcal{T}_2, \ldots, \mathcal{T}_m\}$ (302).

Rating system processes the performance measures of the policies on the tasks to generate data defining a joint probability distribution $\sigma(\pi, \mathcal{T})$ over a set of policy-task pairs $(\pi_i, \mathcal{T}_j)$ (304).

Rating system processes the join probability distribution $\sigma(\pi, \mathcal{T})$ over the set of policy-task pairs $(\pi_i, \mathcal{T}_j)$ (308), e.g., as described above.

After processing the joint distribution, rating system generates a respective rating $r_i$ for each action selection policy in the pool of action selection policies $\pi_i \in \Pi$ (310). The policy rating $r_i$ for each policy $\pi_i$ in the policy pool characterizes a utility of the action selection policy in performing tasks from the pool of tasks.

Alternatively or in addition, after processing the joint distribution, rating system generates a respective rating $d_j$ for each task in the pool of tasks $\mathcal{T}_j \in T$ (312). The task rating $d_j$ for each task $\mathcal{T}_j$ characterizes a level of difficulty of the task for action selection policies in the pool of action selection policies.

Figure 4A:
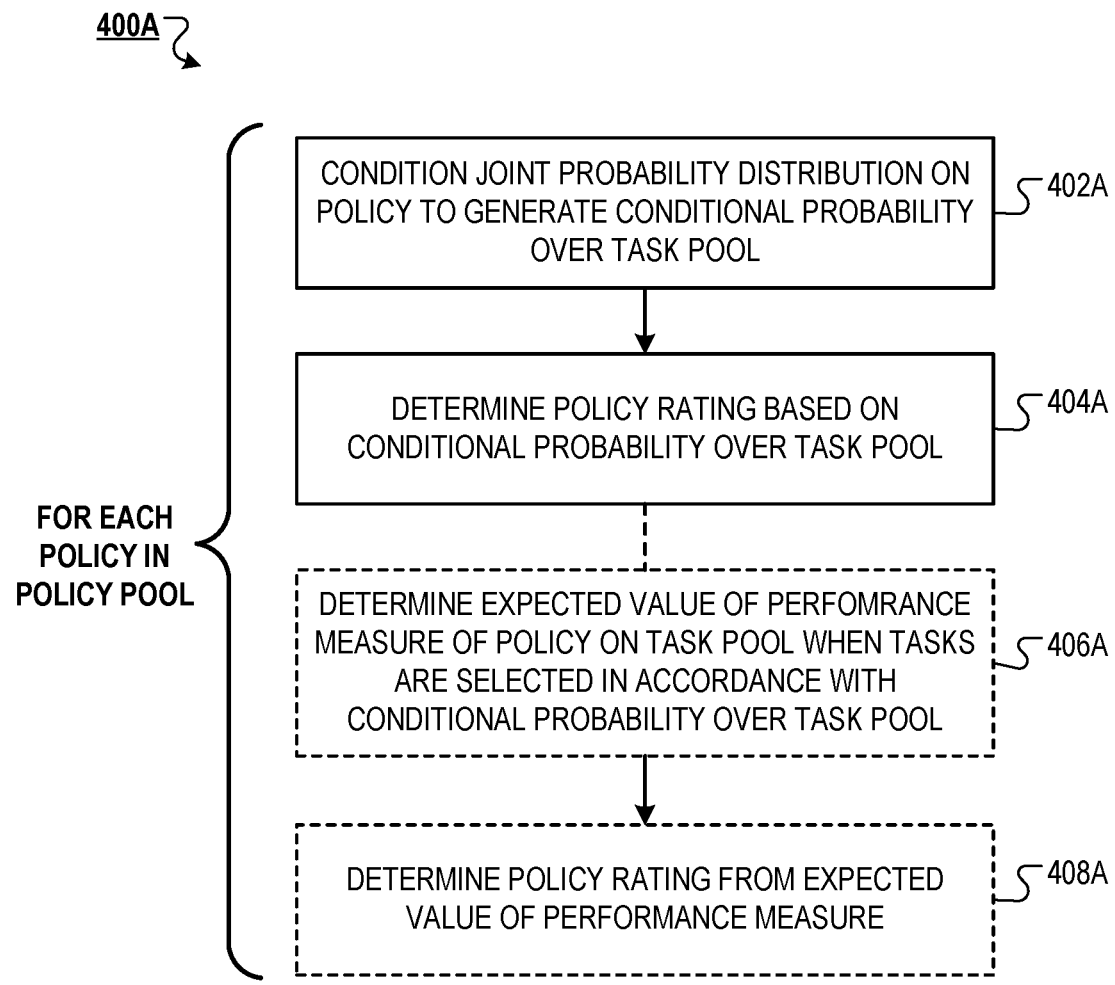
FIG. 4A is a flow diagram of an example subprocess for rating policies in a policy pool.

FIG. 4A shows an example process 400A for generating ratings for policies. For convenience, the process 400A will be described as being performed by a system of one or more computers located in one or more locations. For example, a policy rating subsystem, e.g., the policy rating subsystem 200A of FIG. 2A, appropriately programmed in accordance with this specification, can perform the process 400A.

For each policy in the policy pool $\pi_i \in \Pi$:

Policy rating subsystem conditions the joint probability distribution $\sigma(\pi, \mathcal{T})$ on the given policy $\pi_i$ to generate a conditional probability distribution over the task pool $\sigma(\mathcal{T}|\pi_i)$ (402A).

Policy rating subsystem determines the policy rating $r_i$ based on the conditional probability distribution over the task pool $\sigma(\mathcal{T}|\pi_i)$ (404A).

To determine the policy rating $r_i$, policy rating subsystem can perform the following steps 406A and 408A:

Policy rating subsystem determines an expected value of a performance measure $P_{ij}^{(1)}$ of the policy $\pi_i$ on tasks in the task pool T when tasks are selected in accordance with the conditional probability distribution over the task pool $\sigma(\mathcal{T}|\pi_i)$ (406A).

Policy rating subsystem determines the policy rating $r_i$ from the expected value of the performance measure $r_i = \Sigma_{ij} P_{ij}^{(1)} \sigma(\mathcal{T}_j|\pi_i)$ (408A).

Figure 4B:
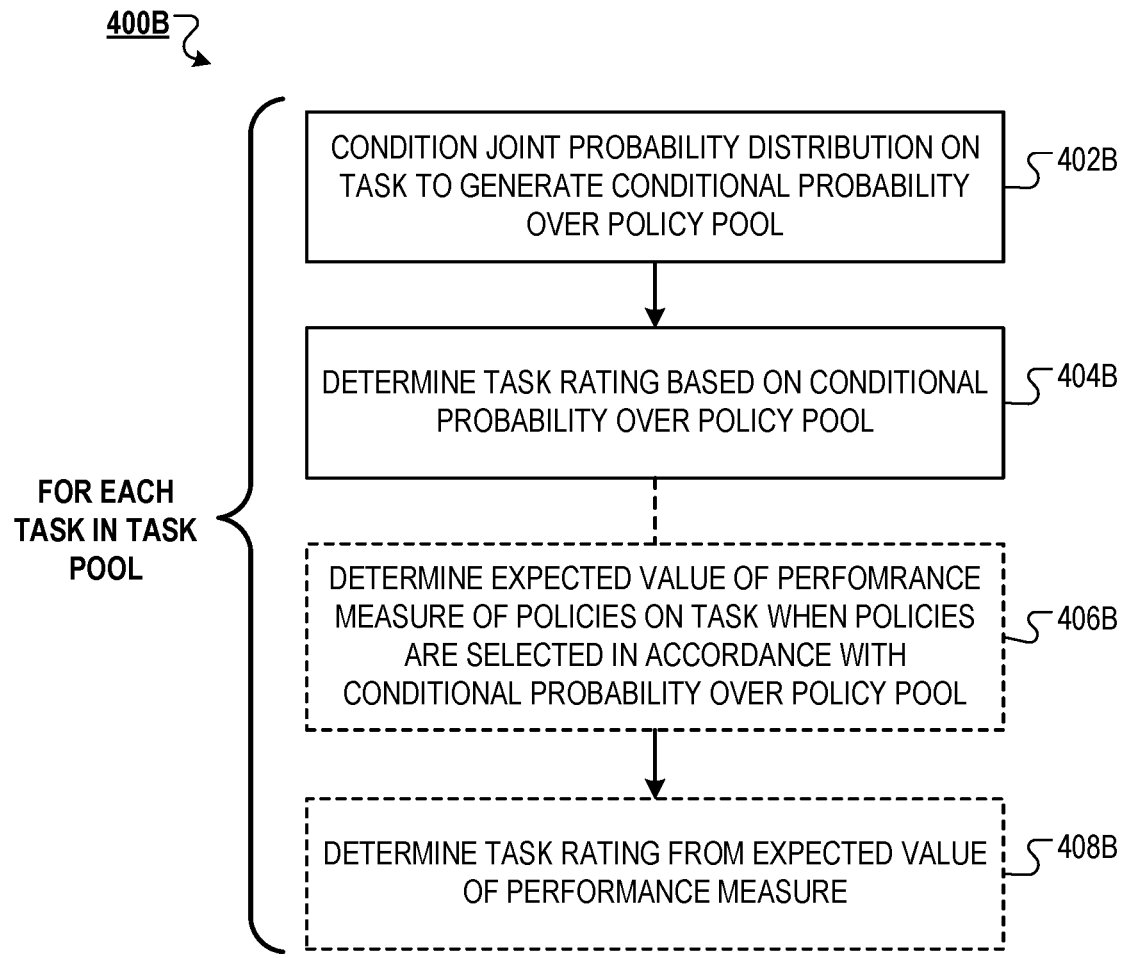
FIG. 4B is a flow diagram of an example subprocess for rating tasks in a task pool.

FIG. 4B shows an example process 400B for generating ratings for tasks. For convenience, the process 400B will be described as being performed by a system of one or more computers located in one or more locations. For example, a task rating subsystem, e.g., the task rating subsystem 200B of FIG. 2B, appropriately programmed in accordance with this specification, can perform the process 400B.

For each task in the task pool $\mathfrak{T}_j \in T$:

Task rating subsystem conditions the joint probability distribution $\sigma(\pi, \mathfrak{T})$ on the given task $\mathfrak{T}_j$ to generate a conditional probability distribution over the policy pool $\sigma(\pi|\mathfrak{T}_j)$ (402B).

Task rating subsystem determines the task rating $d_j$ based on the conditional probability distribution over the policy pool $\sigma(\pi|\mathfrak{T}_j)$ (404B).

To determine the task rating $d_j$, task rating subsystem can perform the following steps 406B and 408B:

Task rating subsystem determines an expected value of a performance measure $P_{ij}^{(2)}$ of policies in the policy pool $\Pi$ on the task $\mathfrak{T}_j$ when policies are selected in accordance with the conditional probability distribution over the policy pool $\sigma(\pi|\mathfrak{T}_j)$ (406B).

Task rating subsystem determines the task rating $d_j$ from the expected value of the performance measure $d_j = \Sigma_{ij} P_{ij}^{(2)} \sigma(\pi_i|\mathfrak{T}_j)$ (408B).

Figure 5:
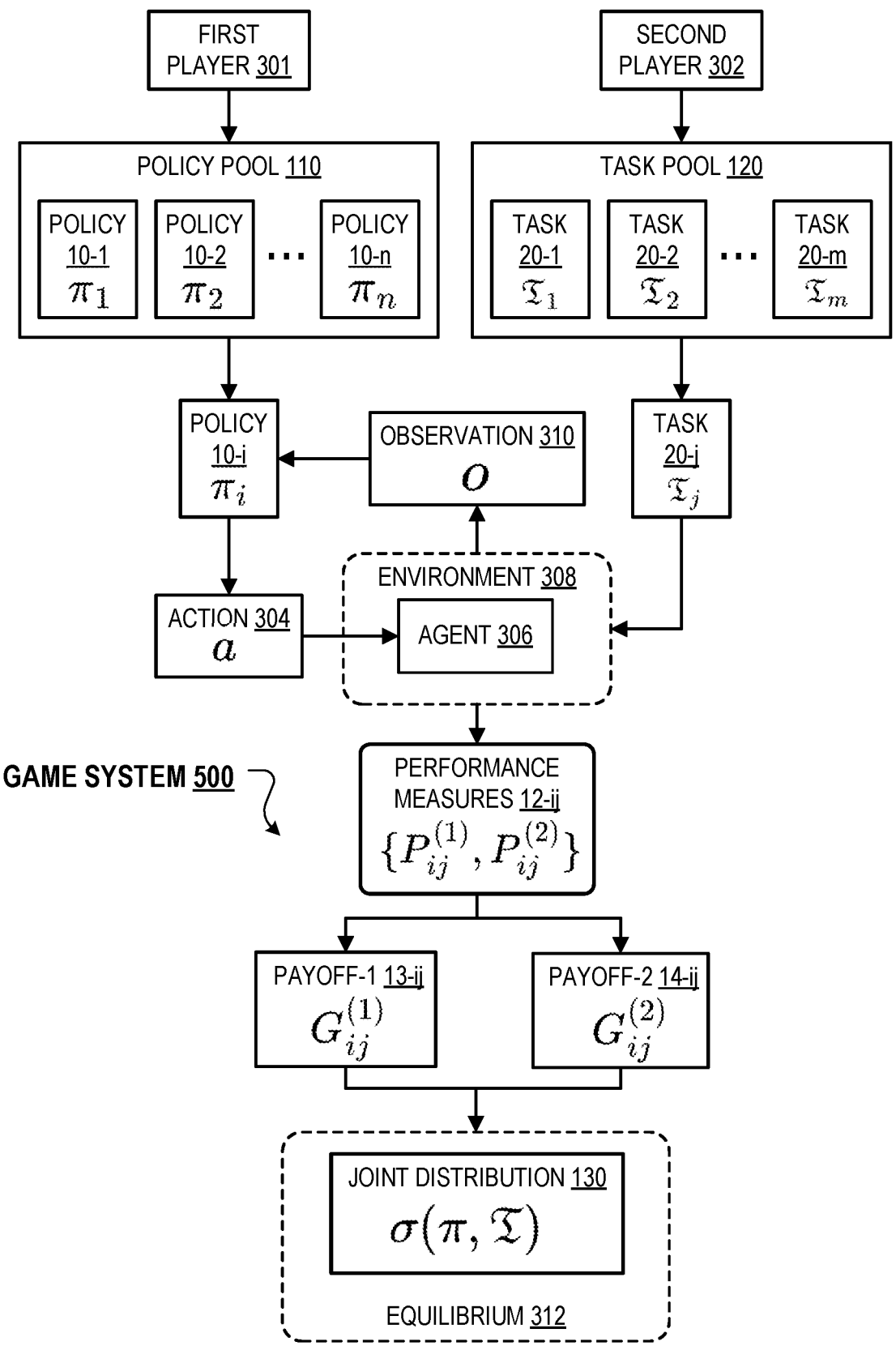
FIG. 5 is a block diagram of an example two-player game system.

FIG. 5 shows an example of a game system 500 that can generate joint probability distributions from equilibrium-based solutions of games. For example, rating system 100 can utilize game system 500 to generate the joint distribution for use in assigning ratings to policies and/or tasks. Together, rating system 100 and game system 500 facilitate a robust, consistent and unambiguous rating algorithm for rating policies and tasks using game theoretic methods. While any joint distribution can be used by rating system 100 to calculate policy and task ratings, game theoretic distributions, such as ones that are in equilibrium, have a number of advantages, e.g., allowing competitive, cooperative and/or repeated strategies to be rated. Game theoretic distributions can place significance on, for example, niche policies and/or niche tasks that would otherwise be ignored. The game system 500 is an example of a system implemented as computer programs on one or more computers in one or more locations in which the systems, components, and techniques described below are implemented.

Perhaps the best known rating algorithm is Elo which is often used to rate players in two-player, symmetric, constant-sum games (e.g., zero-sum games), most famously in Chess. However, Elo is only suitable for describing highly transitive games. The game system 500 described herein can be utilized in, for example, normal-form and normal-form constructed empirical N-player, nonsymmetric, general-sum games having "strategic" elements, e.g., nontransitive cycles between strategies. Single-player multi-task reinforcement learning can be formulated as a two-player game between an agent player (e.g., a first player) and an environment player (e.g., a second player), with strategies describing different policies and different tasks, respectively. The example game system 500 of FIG. 5 is formulated in such a manner.

Game system 500 is a two-player game defined by performance measures of policies on tasks. The game system 500 includes a first player 301 and a second player 302. The first player 301 selects an action selection policy 10-$i$ from the pool of action selection policies 110 and the second player 302 selects a task 20-$j$ from the pool of tasks 120.

The selected policy $\pi_i$ is used to control an agent 306 interacting in an environment 308. The selected task $\mathfrak{T}_j$ designates a particular task to be accomplished by the agent 306 when interacting in the environment 308. For each time step in a sequence of time steps to accomplish the task $\mathfrak{T}_j$, the policy $\pi_i$ receives an observation o 310 characterizing a state s of the environment 308 which is processed by the policy $\pi_i$ (e.g., as an action selection policy neural network) to generate an action a 304 in response to the observation o 310. The agent 306 then performs the action a 304 to change the state s'←s of the environment 308 which is characterized by a new observation o'. This can repeat for any number of time steps depending on any number of criteria, e.g., a maximum time duration, until the task $\mathfrak{T}_j$ is accomplished or partially accomplished, etc.

Game system 500 generates performance measures 12-$ij$ characterizing a performance of the agent 306 controlled by the policy 10-$i$ selected by the first player 301 on the task 20-$j$ selected by the second player 302. For example, if the task $\mathfrak{T}_j$ is described by a MDP, the performance measures $\{P_{ij}^{(1)}, P_{ij}^{(2)}\}$ can characterize an expected return, e.g., an expected discounted sum of rewards. Alternatively or in addition, the performance measures can characterize the total time duration for the policy $\pi_i$ to complete the task $\mathfrak{T}_j$.

Game system 500 generates a respective payoff for each player, 301 and 302, based on the performance measures $\{P_{ij}^{(1)}, P_{ij}^{(2)}\}$. That is, first player 301 receives payoff-1 13-$ij$ and second player 302 receives payoff-2 14-$ij$ based on the performance of the agent 306 in the environment 308. The respective payoffs $G_{ij}^{(1)}$ and $G_{ij}^{(2)}$ for first player 301 and second player 302 can be implemented in any desired fashion to accommodate any particular strategies for the players, e.g., competing or cooperating strategies. In many cases, payoffs that are directly proportional to the performance measures, i.e., $G_{ij}^{(1)} \propto P_{ij}^{(1)}$ and $G_{ij}^{(2)} \propto P_{ij}^{(2)}$, can be useful since the goal of each player, 301 and 302, is generally to maximize their respective payoffs and therefore to maximize and/or minimize the respective performance measures.

For robust rating of policies and tasks, a competing implementation can be advantageous. In this case, first player 301 generally aims to select the best policy 10-$i$ to perform the task 20-$j$ and second player 302 generally aims to select the most difficult task 20-$j$ for the policy 10-$i$. Conversely, in a cooperating implementation, second player 302 may aim to select the easiest task 20-$j$ for the policy 10-$i$. Cooperating strategies can be useful if the goal of rating system 100 and game system 500 is to determine which policies and tasks are mutually aligned with one another.

To facilitate competing strategies between the players, game system 500 can implement the payoffs 13-$ij$ and 14-$ij$ in an adversarial manner such that the gain of first player 301 directly corresponds to a loss for second player 302, and vice versa. For example, in some implementations, the payoffs can be implemented as zero-sum, such that payoffs received are $G_{ij}^{(1)} = P_{ij}^{(1)} - P_{ij}^{(2)}$ and $G_{ij}^{(2)} = P_{ij}^{(2)} - P_{ij}^{(1)} = -G_{ij}^{(1)}$. This also takes into account the case when, for example, $P_{ij}^{(1)} = -P_{ij}^{(2)}$. Hence, when first player 301 receives an increased payoff-1 13-$ij$, second player 302 receives a reduced payoff-2 14-$ij$ due to performance of the agent 306, and vice versa.

To facilitate cooperating strategies between players, game system 500 can implement the payoffs 13-$ij$ and 14-$ij$ in a reciprocal manner such that any gain of first player 301 directly corresponds to a gain for second player 302, and vice versa. For example, in some implementations, the payoffs can be implemented as mutual-sum, such that payoffs received are $G_{ij}^{(1)} = P_{ij}^{(1)} + P_{ij}^{(2)}$ and $G_{ij}^{(2)} = P_{ij}^{(1)} + P_{ij}^{(2)} = G_{ij}^{(1)}$. This also takes into account the case when, for example, $P_{ij}^{(1)} = P_{ij}^{(2)}$. Hence, when first player 301 receives an increased payoff-1 13-$ij$, second player 302 also receives an increased payoff-2 14-$ij$ due to performance of the agent 306, and vice versa.

Note though, the respective payoff received by first player 301 and second player 302 can be nonlinear in the performance measures 12-*ij*, as well as nonsymmetric and/or general-sum ($G_{ij}^{(1)}+G_{ij}^{(2)}\neq$constant). In general, the game system 500 can accommodate any desired functional dependence of $G_{ij}^{(1)}$ and $G_{ij}^{(2)}$ on $\{P_{ij}^{(1)}, P_{ij}^{(2)}\}$ to implement any desired strategies for the players 301/302. For example, the payoffs 13-*ij*/14-*ij* can be exponential in the performance measures 12-*ij*, such that $$G_{ij}^{(1)} = \left[1 - \exp\left(\frac{P_{ij}^{(1)} - P_{ij}^{(2)}}{P_0}\right)\right]^{-1} = 1 - G_{ij}^{(2)},$$

where $P_0$ is a normalization constant.

Game system 500 derives the joint probability distribution $\sigma(\pi, \mathfrak{T})$ 130 over the set of policy-task pairs $(\pi_i, \mathfrak{T}_j)$ from an equilibrium-based 312 solution of the game between first player 301 and second player 302. As will be described in detail below, multiple different equilibrium-based 312 solution concepts can be implemented by game system 500. Broadly, the joint distribution 130 defines how policies and tasks are selected, and determining the joint distribution 130 from an equilibrium-based 312 solution of the game (based on the performance measures 12-*ij*) defines how players 301/302 should select policies/tasks given the payoffs 13-*ij*/14-*ij* available to each player and any "knowledge" they have of the other players.

One such solution concept is Nash equilibrium (NE), which is tractable, interchangeable and unexploitable in two-player, zero-sum games. NEs are associated with factorizable joint distributions, i.e., $\sigma(\pi_i, \mathfrak{T}_j)=\sigma(\pi_i)\sigma(\mathfrak{T}_j)$. As the joint distribution 130 is assumed factorizable, the probability of selecting a policy or task is independent from one another, therefore each player is assumed to know how another will select a policy or task (based on their respective marginal distributions).

A related solution concept is correlated equilibrium (CE) which is suitable for N-player, general-sum settings where, for example, first player 301 and second player 302 are allowed to coordinate strategies with each other if it is mutually beneficial. Game system 500 can implement CE via a correlation device which samples a joint strategy (a policy-task pair) from a public joint distribution and recommends the sampled strategy secretly to first player 301 and second player 302. The joint distribution 130 is in correlated equilibrium if neither first player 301 nor second player 302 is incentivized to unilaterally deviate from the recommendation after receiving it. Thus, in CE, there is an assumption that each player knows the conditional probabilities of the other when they select a particular policy or task (as the joint distribution is known to each player but not the particular recommendation to the other players). CEs that are factorizable are also NEs.

An additional solution concept, coarse-correlated equilibrium (CCE), has first player 301 and second player 302 commit to the recommendation before it has been sampled. In CCE, there is an assumption that no player knows how another will select a policy or task (as the players cannot deviate from the joint distribution even though it is known to each player). In general, CCE is less computationally expensive than NE and CE while permitting even higher equilibrium payoffs. These sets are related to each other as NE$\subseteq$CE$\subseteq$CCE.

All these equilibria have approximate forms parameterized by an approximation parameter $\epsilon$ that describes the maximum allowed incentive to deviate to a best response (across all players). For example, game system 500 can implement an approximate equilibrium using i) a standard equilibrium, denoted with $\epsilon$, which describes the bound on incentive to deviate under the joint distribution 130, or ii) a well-supported (WS) equilibrium, denoted with $\hat{\epsilon}$, which describes the bound on incentive to deviate under the conditionals. When $\hat{\epsilon}=\epsilon=0$, these implementations become equivalent. The standard equilibrium has the property that any $\epsilon > \epsilon^{min}$ will permit a full-support equilibrium, where $\epsilon^{min} \leq 0$ is the minimum $\epsilon$ that permits a feasible solution. Note, first player 301 and second player 302 may have individual tolerances to deviation, $\epsilon^{(1)}$ and $\epsilon^{(2)}$, respectively.

Equilibria 312 can be represented in terms of linear inequality constraints, that is, as deviation gains, $A^{(1)}$ and $A^{(2)}$, for first player 301 and second player 302 respectively:

$$A_{i'ij}^{(1)} = G_{i'j}^{(1)} - G_{ij}^{(1)}, A_{ij'j}^{(2)} = G_{ij'}^{(2)} - G_{ij}^{(2)}$$

Each constraint corresponds to i deviating to i' or j deviating to j'. Specifically, the first player 301 chooses a different policy $\pi_{i'\neq i}$ for task $\mathfrak{T}_j$ and sees a corresponding gain $A_{i'ij}^{(1)}$ due to deviation i→i', while the second player 302 chooses a different task $\mathfrak{T}_{j'\neq j}$ for policy $\pi_i$ and sees a corresponding gain $A_{ij'j}^{(2)}$ due to deviation j=>j'. Equilibrium 312 is achieved when neither first player 301 nor second player 302 has incentive to deviate. For CE, this can be expressed as:

$$\hat{\epsilon} - CE: \sum_j \sigma(\mathfrak{T}_j | \pi_i) A_{i'ij}^{(1)} \leq \hat{\epsilon}^{(1)}, \sum_i \sigma(\pi_i | \mathfrak{T}_j) A_{ij'j}^{(2)} \leq \hat{\epsilon}^{(2)}$$

$$\epsilon - CE: \sum_j \sigma(\pi_i, \mathfrak{T}_j) A_{i'ij}^{(1)} \leq \epsilon^{(1)}, \sum_i \sigma(\pi_i, \mathfrak{T}_j) A_{ij'j}^{(2)} \leq \epsilon^{(2)}$$

Well-supported $\hat{\epsilon}$ equilibria are defined if $\sigma(\pi_i) > 0$ and $\sigma(\mathfrak{T}_j) > 0$. CCEs can be derived from the CE by summing over policies and tasks available to the first player 301 and the second player 302, respectively. There is not a well-supported $\hat{\epsilon}$ equilibrium for CCEs:

$$\epsilon - CCE: \sum_{ij} \sigma(\pi_i, \mathfrak{T}_j) A_{i'ij}^{(1)} \leq \epsilon^{(1)}, \sum_{ij} \sigma(\pi_i, \mathfrak{T}_j) A_{ij'j}^{(2)} \leq \epsilon^{(2)}$$

NEs have similar implementations to CEs but possess an extra constraint that the joint distribution 130 factorizes $\sigma(\pi_i, \mathfrak{T}_j)=\sigma(\pi_i)\sigma(\mathfrak{T}_j)$, resulting in nonlinear constraints:

$$\hat{\epsilon} - NE: \sum_j \sigma(\mathfrak{T}_j) A_{i'ij}^{(1)} \leq \hat{\epsilon}^{(1)}, \sum_i \sigma(\pi_i) A_{ij'j}^{(2)} \leq \hat{\epsilon}^{(2)}$$

$$\hat{\epsilon} - NE: \sum_j \sigma(\pi_i)\sigma(\mathfrak{T}_j) A_{i'ij}^{(1)} \leq \hat{\epsilon}^{(1)}, \sum_i \sigma(\pi_i)\sigma(\mathfrak{T}_j) A_{ij'j}^{(2)} \leq \epsilon^{(2)}$$

When a joint distribution 130 is in any of the above equilibria 312, neither first player 301 nor second player 302 has incentive to unilaterally deviate from it to achieve a better payoff. Note though, the game system 500 may contain multiple equilibria 312 and therefore multiple joint distributions 130 when employing any of the abovementioned solution concepts. Game system 500 can utilize various objective functions for selecting amongst the equilibria 312 which are described in detail below.

For NEs, game system 500 can use a maximum entropy (ME) criterion (MENE, e.g., Balduzzi et al. "Re-evaluating evaluation", 2018) to select amongst equilibria 312, which always exists and is unique in two-player, constant-sum settings.

(C)CEs permit a convex polytope of valid solutions which are defined by their linear inequality constraints. Game system 500 can use multiple convex objective functions to select from the set of valid (C)CE solutions including, but not limited to, maximum entropy (ME(C)CE), $$-\sum_{ij} \sigma(\pi_i, \mathcal{T}_j) \ln[\sigma(\pi_i, \mathcal{T}_j)]$$

Maximum Gini (MG(C)CE), $$\sum_{ij} [1 - \sigma^2(\pi_i, \mathcal{T}_j)]$$

and maximum welfare (MW(C)CE), $$\sum_{ij} \sigma(\pi_i, \mathcal{T}_j)\left(G_{ij}^{(1)} + G_{ij}^{(2)}\right)$$

Game system 500 can implement various other methods such as quantal response equilibrium (QRE) and α-Rank to obtain unique equilibrium-based 312 solutions and joint distributions 130.

As an exemplary implementation, game system 500 can use coarse-correlated equilibrium (CCE) for the solution concept and maximum entropy (ME) for the equilibrium selection function. CCE solution concepts have a number of advantages: a) full joint distributions 130 allow cooperative as well as competitive games to be rated (factorizable distributions such as NE tend to struggle with cooperative components), b) CCEs are generally more tractable to compute than CEs and NEs, c) full-support CCEs can be implemented with only a single variable per strategy, d) they are amenable to equilibrium selection because CCEs permit a convex polytope of solutions, e) under a CCE, neither first player 301 nor second player 302 has incentive to deviate from the joint (possibly correlated) distribution 130 unilaterally since it would not result in better payoffs, and f) the empirical joint strategy of no-regret algorithms in self-play converge to a CCE.

In combination with CCEs, ME with any $\epsilon > \epsilon^{min}$ spreads at least some marginal probability over all joint strategies meaning the conditional distributions, and thus the policy and task ratings, are always well-defined. This equilibrium selection method is also invariant under affine transforms of the payoffs 13-$ij$ and 14-$ij$, scales well to larger numbers of players and strategies, and is principled in that it makes minimal assumptions about the joint distribution 130. Empirically, ME can group policies and tasks within strategic cycles with each other. Game system 500 using a MECCE solution near $\epsilon^{min}$ allows for a strong, high value equilibrium 312 to be selected which can be particularly useful for coordination games.

Figure 6:
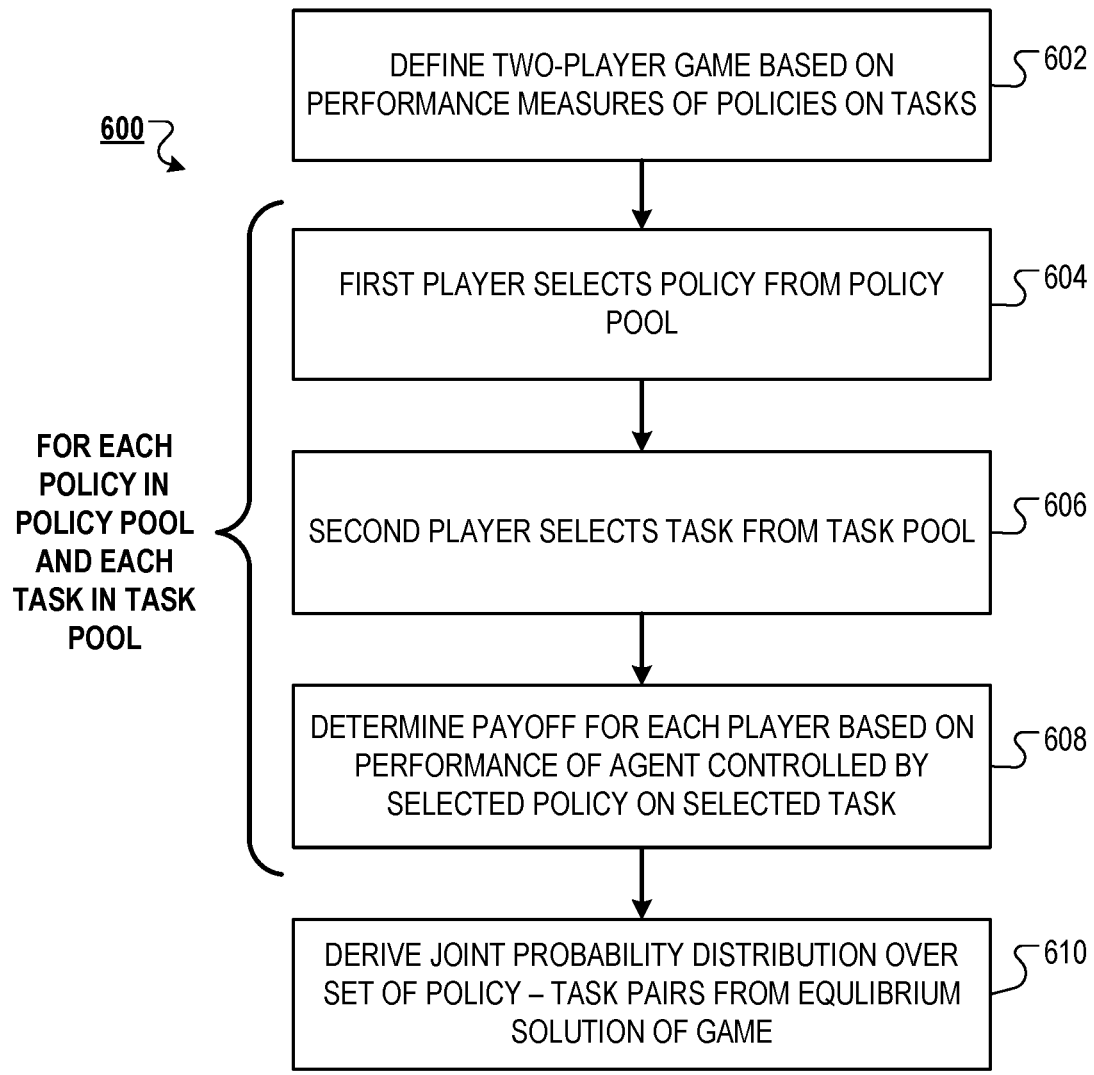
FIG. 6 is a block diagram of an example process for performing a two-player game.

FIG. 6 shows an example process 600 for performing a two-player game. For convenience, the process 600 will be described as being performed by a system of one or more computers located in one or more locations. For example, a game system, e.g., the game system 500 of FIG. 5, appropriately programmed in accordance with this specification, can perform the process 600.

Game system defines a two-player game based on performance measures of action selection policies on tasks (602).

For each action selection policy in a pool of action selection policies and each task in a pool of tasks:

A first player of game system selects an action selection policy from the pool of action selection policies $\pi_i \in \Pi$ (604).

A second player of game system selects a task from the pool of tasks $\mathcal{T}_j \in T$ (606).

Game system determines a respective payoff, $G_{ij}^{(1)}$ and $G_{ij}^{(2)}$, for each player based on performance $\{P_{ij}^{(1)}, P_{ij}^{(2)}\}$ of an agent controlled by the policy $\pi_i$ selected by the first player on the task $\mathcal{T}_j$ selected by the second player (608).

Game system derives a joint probability distribution $\sigma(\pi, \mathcal{T})$ over a set of policy-task pairs $(\pi_i, \mathcal{T}_j)$ from an equilibrium-based solution of the game (610). The solution concept can be, for example, a Nash equilibrium solution of the game, a correlated equilibrium solution of the game, or a coarse-correlated solution of the game.

Figure 7:
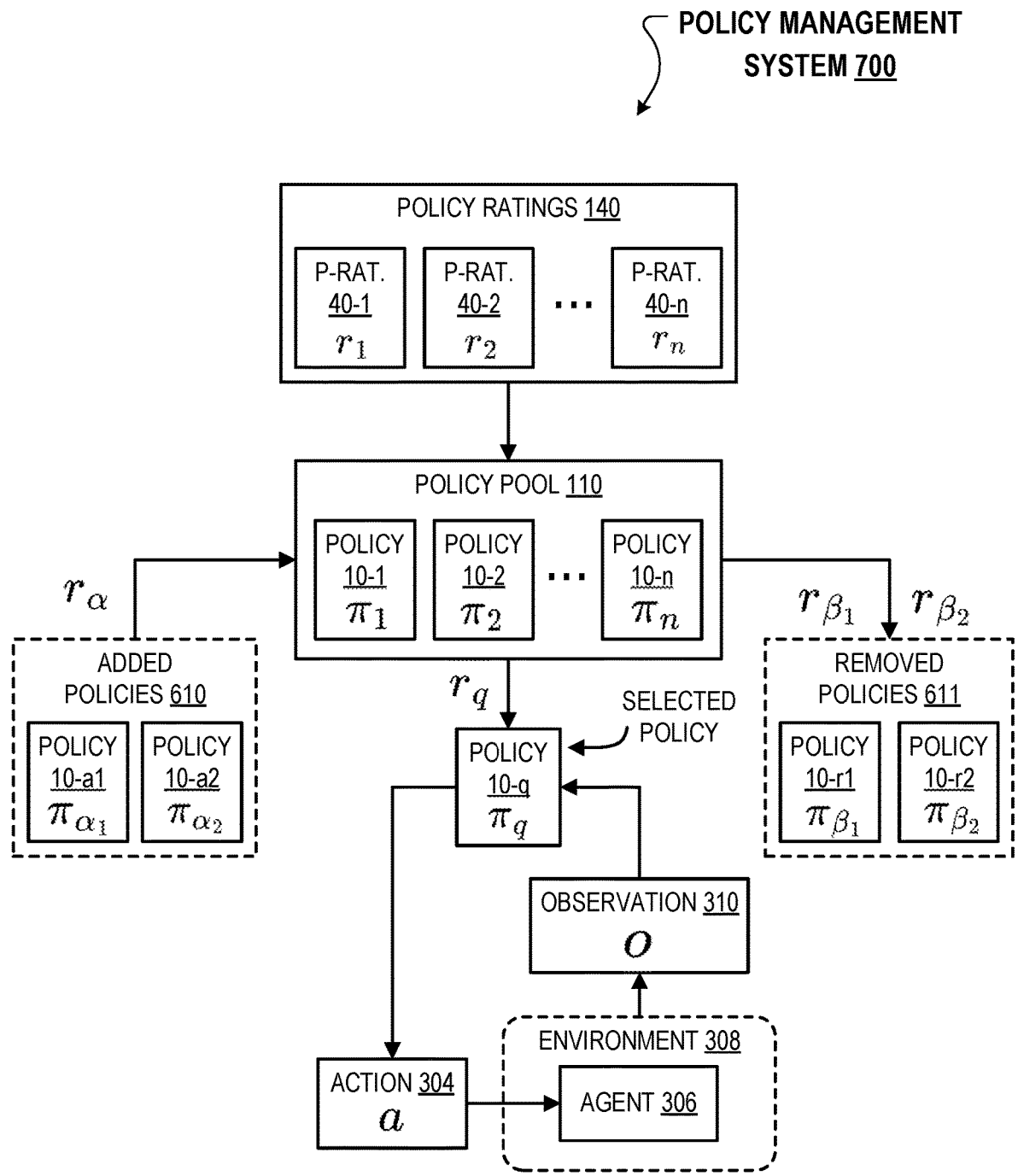
FIG. 7 is a block diagram of an example policy management system.

FIG. 7 shows an example of a policy management system 700 that can manage policies in a policy pool based on their respective policy ratings. The policy management system 700 is an example of a system implemented as computer programs on one or more computers in one or more locations in which the systems, components, and techniques described below are implemented.

Management system 700 can perform various functions on action selection policies 10-1 . . . n in a pool of action selection policies 110 based on their respective policy ratings 40-1 . . . n in a set of policy ratings 140. In particular, management system 700 can use the policy ratings 40-1 . . . n as "fitness scores" to facilitate population based managing, updating and/or training of the policies 10-1 . . . n in the policy pool 110.

Upon receiving a request to control an agent 306, the management system 700 can select a policy 10-$q$ based on the set of policy ratings 140. An associated rating $r_q$ 40-$q$ of the policy $\pi_q$ can indicate that $\pi_q$ is one of the "best-performing" policies in the policy pool 110, e.g., indicating the policy is one of highest utility for performing tasks. The selected policy $\pi_q$ can be used to guide the agent 306 interacting in an environment 308. That is, the selected policy $\pi_q$ can process observations o 310 characterizing states s of the environment 308 to generate actions a 304 to be performed by the agent 306.

The management system 700 can update the policy pool 110 in a variety of ways based on the set of policy ratings 140, allowing favorable and/or unfavorable policies to be retained and/or discarded, respectively. The rating system 100 can then generate policy ratings for the updated policy pool 110, e.g., by using a new game theoretic joint distribution derived by the game system 500, which can be subsequently re-updated by the management system 700. This interplay between rating system 100, game system 500 and management system 700, which can be iterated multiple times, can cause the policy pool 110 to converge to an ideal collection of policies. In other words, the management system 700 can iteratively evolve the policy pool 110, using the policy ratings 140 generated by the rating system 100 and the game system 500, to encourage the generation of policies associated with higher ratings, e.g., because such policies may be particularly effective at executing tasks.

To update the policy pool 110, management system 700 can remove one or more policies, e.g., policy $\pi_{\beta_1}$ 10-$r$1 and policy $\pi_{\beta_2}$ 10-$r$2, based on their respective policy ratings, e.g., $r_{\beta_1}$ and $r_{\beta_2}$. Removed policies 611 can correspond to policies with the lowest policy ratings, e.g., having the least utility in accomplishing tasks.

Management system 700 can also reproduce one or more policies in the policy pool 110 to update the policy pool 110. In particular, management system 700 can generate one or more new policies, e.g., policy $\pi_{\alpha_1}$ 10-$a1$ and policy $\pi_{\alpha_2}$ 10-$a2$, based on an existing policy $\pi_\alpha$ in the policy pool 110, and thereafter add the new policies to the policy pool 110. Added policies 610 can correspond to modifications of the existing policy $\pi_\alpha$ that, for example, has high utility in accomplishing tasks indicated by a relatively high policy rating $r_\alpha$.

For instance, if the existing policy $\pi_\alpha$ defines an existing action selection neural network, management system 700 can generate the new policies, $\pi_{\alpha_1}$ and $\pi_{\alpha_2}$, by instantiating new neural networks having architectures that are modifications of the existing neural network, e.g., by adding or removing one or more neural network layers from the existing neural network and/or altering network parameters of the existing neural network.

Figure 8A:
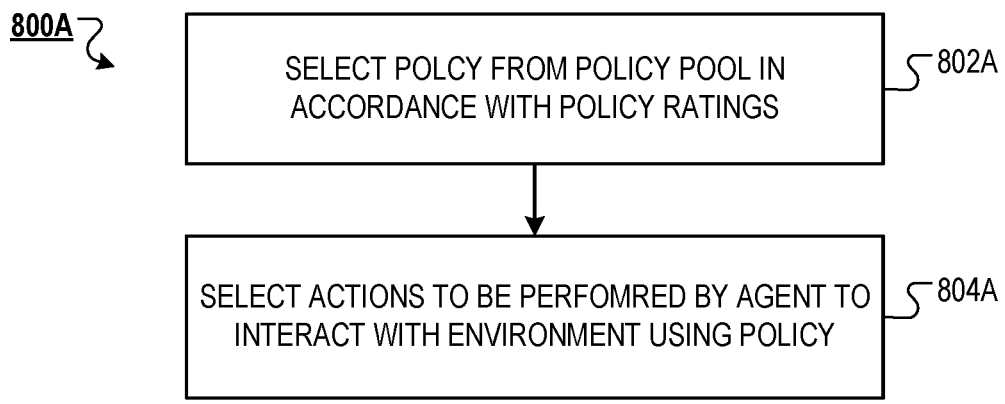
FIG. 8A is a flow diagram of an example process for selecting policies from a policy pool based on policy ratings.

FIG. 8A shows an example process 800A for selecting policies from a policy pool based on policy ratings. For convenience, the process 800A will be described as being performed by a system of one or more computers located in one or more locations. For example, a policy management system, e.g., the policy management system 700 of FIG. 7, appropriately programmed in accordance with this specification, can perform the process 800A.

Management system selects an action selection policy from a pool of action selection policies in accordance with ratings of the policies (802A).

Management system selects actions to be performed by an agent to interact with an environment using the selected policy (804A).

Figure 8B:
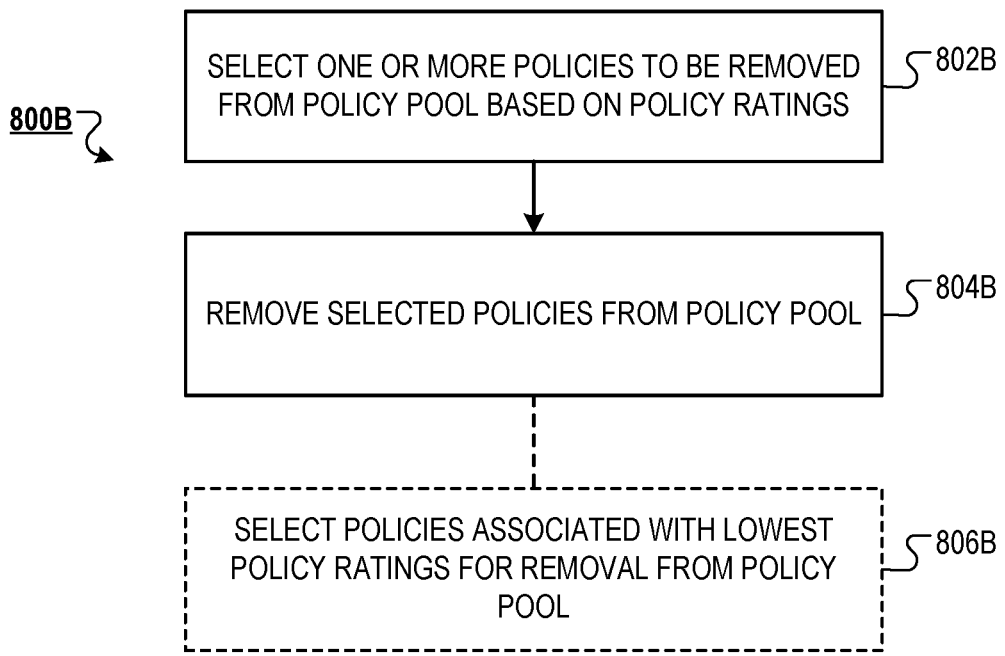
FIG. 8B is a flow diagram of an example process for removing policies from a policy pool based on policy ratings.

FIG. 8B shows an example process 800B for removing policies from a policy pool based on policy ratings. For convenience, the process 800B will be described as being performed by a system of one or more computers located in one or more locations. For example, a policy management system, e.g., the policy management system 700 of FIG. 7, appropriately programmed in accordance with this specification, can perform the process 800B.

Management system selects one or more action selection policies for removal from a pool of action selection policies based on ratings of the policies (802B).

Management system removes the selected policies from the policy pool (804B).

Management system can select one or more policies associated with the lowest ratings from among the policy pool for removal from the policy pool (806B).

Figure 8C:
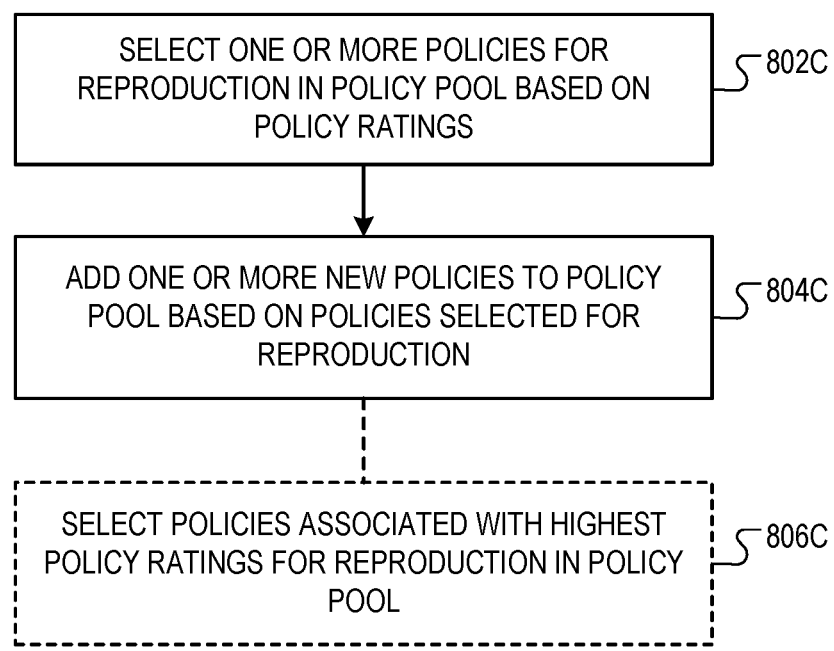
FIG. 8C is a flow diagram of an example process for adding policies to a policy pool based on policy ratings.

FIG. 8C shows an example process 800C for adding policies to a policy pool based on policy ratings. For convenience, the process 800C will be described as being performed by a system of one or more computers located in one or more locations. For example, a policy management system, e.g., the policy management system 700 of FIG. 7, appropriately programmed in accordance with this specification, can perform the process 800C.

Management system selects one or more action selection policies for reproduction from a pool of action selection policies based on ratings of the policies (802C).

Management system adds one or more new policies to the policy pool based on the policies selected for reproduction (804C).

Management system can select one or more policies associated with the highest ratings from among the policy pool for reproduction in the policy pool (806C).

Figure 9:
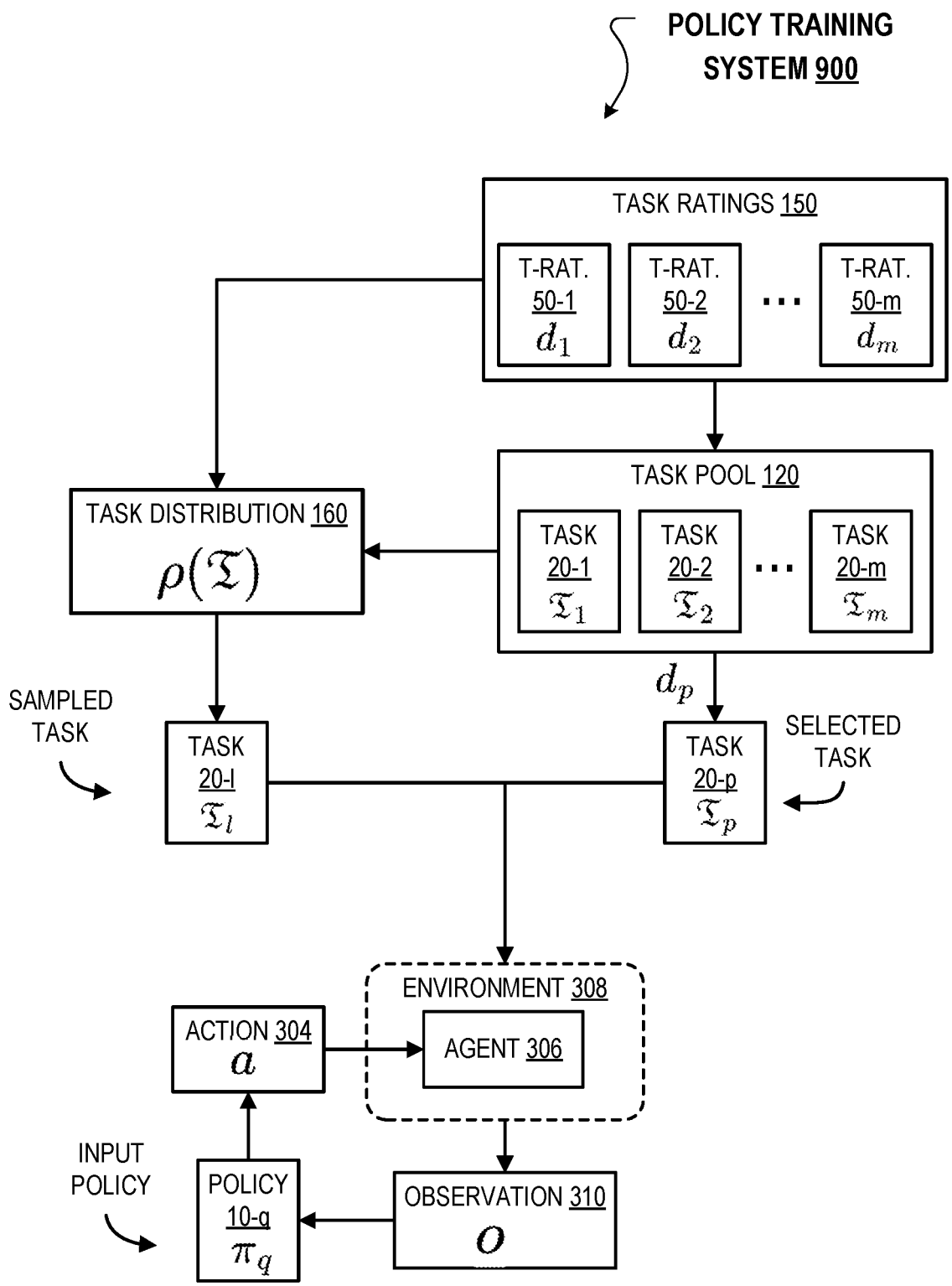
FIG. 9 is a block diagram of an example policy training system.

FIG. 9 shows an example policy training system 900 that can train policies on tasks in a task pool based on their respective task ratings. The policy training system 900 is an example of a system implemented as computer programs on one or more computers in one or more locations in which the systems, components, and techniques described below are implemented.

Training system 900 can receive a request to train an input action selection policy $\pi_q$ 10-$q$ and subsequently train the input policy 10-$q$ on tasks 20-1 . . . $m$ in a pool of tasks 120 based on their respective task ratings 50-1 . . . $m$ in a set of task ratings 150. The input policy 10-$q$ can be selected, for example, by the management system 700 in order to control an agent 306 interacting in an environment 308. That is, the input policy 10-$q$ can process observations o 310 characterizing states s of the environment 308 to generate actions a 304 to be performed by the agent 306 to accomplish one or more particular tasks.

Training system 900 can utilize multiple approaches to train the input policy 10-$q$ on the tasks 20-1 . . . $m$. The task ratings 50-1 . . . $m$ provide a valuable instrument for training system 900 to select tasks for training based on some desired criteria, e.g., on relatively difficult tasks and/or in ascending order of difficulty.

In one implementation, the training system 900 determines a probability distribution over the task pool $\rho(\mathfrak{T})$ 160 based on the set of task ratings 150, where the task distribution 160 corresponds to an m-dimensional array of task probabilities $\rho(\mathfrak{T}_j)$. For example, training system 900 can determine $\rho(\mathfrak{T})$ by processing the task ratings 50-1 . . . $m$ using a soft-max function. The training system 900 can thereafter sample tasks, e.g., task $\mathfrak{T}_j$ 20-1, from the task pool 120 for use in training the input policy 10-$q$ in accordance with the task distribution 160. The training system 900 can thus emphasize training the input policy 10-$q$ based on the task distribution 160, e.g., as the most difficult tasks from the task pool 120 may be more probable and may involve more training iterations relative to easy tasks.

In another implementation, the training system 900 can use the set of task ratings 150 to select tasks of progressively higher levels of difficulty for use in training the input policy 10-$q$. For example, the training system 900 can determine an ordering of the tasks 20-1 . . . $m$ in the task pool 120 based on their respective ratings 50-1 . . . $m$, e.g., in order of increasing level of difficulty. The training system 900 can then select tasks, e.g., task $\mathfrak{T}_p$ 20-$p$, in accordance with the ordering of the tasks, e.g., task rating $d_p$ can correspond to a particular element in the ordering.

Note, training the input policy 10-$q$ to perform a task can refer to adjusting the values of a set of action selection policy parameters to increase the performance of the policy on the task. For example, for an input action selection policy 10-$q$ represented by an action selection neural network, the training system 900 can train the neural network using a reinforcement learning technique, e.g., a Q learning technique or a policy gradient technique. The reinforcement learning technique can refer to iteratively adjusting the parameter values of the neural network to encourage an increase in an expected return (e.g., an expected discounted sum of rewards) received by the agent 306 performing actions 304 selected by the action selection neural network, e.g., by backpropagating gradients of a reinforcement learning objective.

Figure 10:
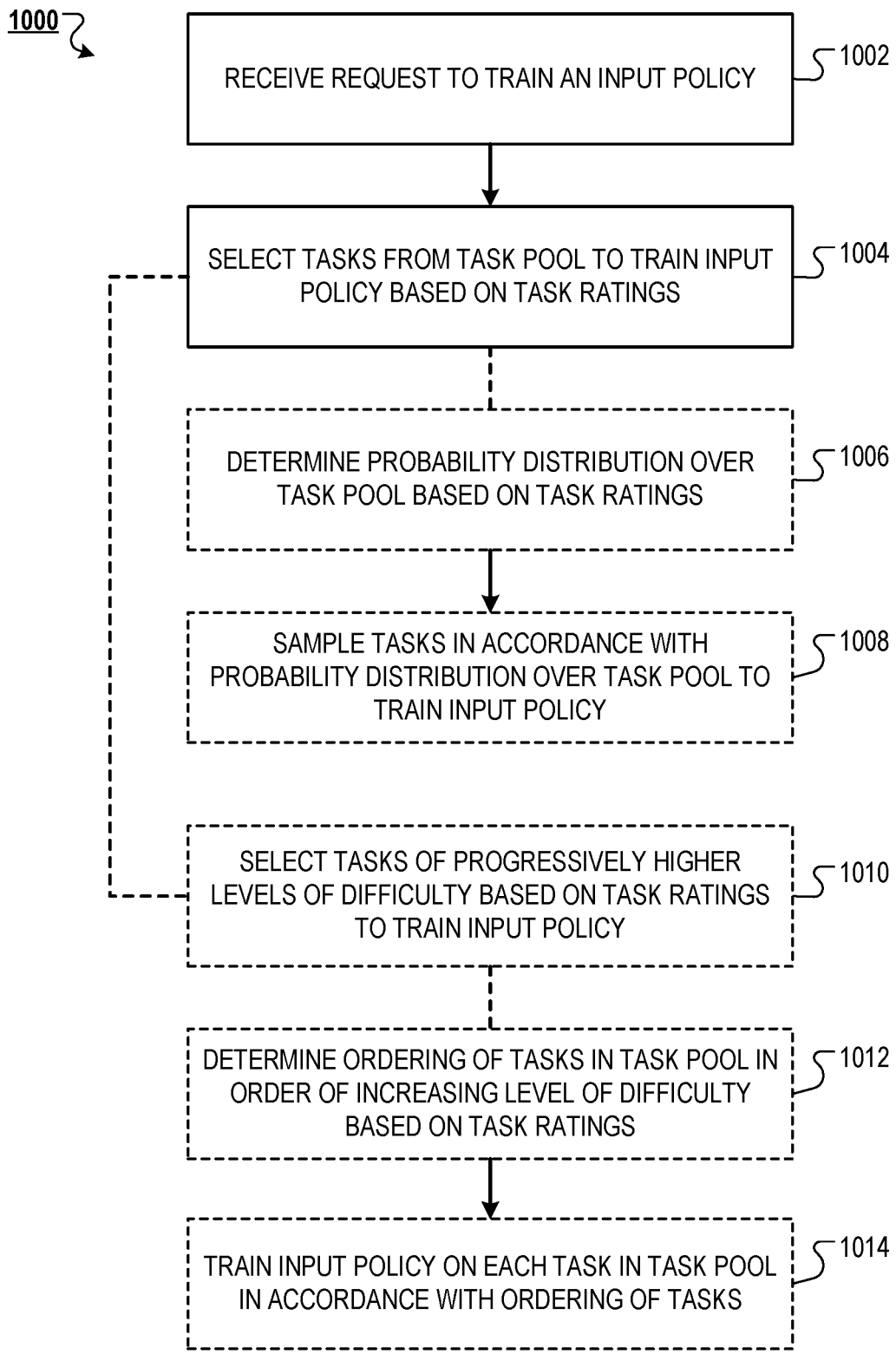
FIG. 10 is a flow diagram of an example process for training policies on tasks in a task pool.

FIG. 10 shows an example process 1000 for training policies on tasks in a task pool. For convenience, the process 1000 will be described as being performed by a system of one or more computers located in one or more locations. For example, a policy training system, e.g., the policy training system 900 of FIG. 9, appropriately programmed in accordance with this specification, can perform the process 1000.

Training system receives a request to train an input action selection policy (1002).

Training system selects tasks from a pool of tasks for use in training the input policy based on ratings of the tasks in the task pool (1004).

Training system can select tasks for training the input policy by performing the following steps 1006-1008 and/or steps 1010-1014.

Training system determines a probability distribution over the task pool based on the task ratings (1006).

Training system samples tasks from the pool of tasks for use in training the input policy in accordance with the probability distribution over the task pool (1008).

Training system selects tasks of progressively higher levels of difficulty from the pool of tasks based on the task ratings for use in training the input policy (1010).

Training system can determine an ordering of the tasks in the task pool in order of increasing level of difficulty based on their ratings (1012).

Training system can train the input policy on each task in the task pool in accordance with the ordering of the tasks in the task pool (1014).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by one or more computers, the method comprising: determining, for each action selection policy in a pool of action selection policies, a respective performance measure of the action selection policy on each task in a pool of tasks, wherein each action selection policy defines a policy for selecting actions to be performed by an agent in an environment; processing the performance measures of the action selection policies on the tasks to generate data defining a joint probability distribution over a set of action selection policy-task pairs, wherein each action selection policy-task pair comprises a respective action selection policy from the pool of action selection policies and a respective task from the pool of tasks; and processing the joint probability distribution over the set of action selection policy-task pairs to generate a respective rating for each action selection policy in the pool of action selection policies, wherein the respective rating for each action selection policy characterizes a utility of the action selection policy in performing tasks from the pool of tasks.

Embodiment 2 is the method of embodiment 1, further comprising: selecting an action selection policy from the pool of action selection policies in accordance with the ratings for the action selection policies; and selecting actions to be performed by an agent to interact with an environment using the selected action selection policy.

Embodiment 3 is the method of embodiment 1, further comprising: updating the pool of action selection policies based on the ratings of the action selection policies.

Embodiment 4 is the method of embodiment 3, wherein updating the pool of action selection policies based on the ratings of the action selection policies comprises: selecting one or more action selection policies for removal from the pool of action selection policies based on the ratings of the action selection policies; and removing the selected action selection policies from the pool of action selection policies.

Embodiment 5 is the method of embodiment 4, wherein selecting one or more action selection policies for removal from the pool of action selection policies based on the ratings of the action selection policies comprises: selecting one or more action selection policies associated with the lowest ratings from among the pool of action selection policies for removal from the pool of action selection policies.

Embodiment 6 is the method of embodiment 3, wherein updating the pool of action selection policies based on the ratings of the action selection policies comprises: selecting one or more action selection policies for reproduction in the pool of action selection policies based on the ratings of the action selection policies; and adding one or more new action selection policies to the pool of action selection policies based on the action selection policies selected for reproduction.

Embodiment 7 is the method of embodiment 6, wherein selecting one or more action selection policies for reproduction in the pool of action selection policies based on the ratings of the action selection policies comprises: selecting one or more action selection policies associated with the highest ratings from among the pool of action selection policies for reproduction in the pool of action selection policies.

Embodiment 8 is the method of embodiment 1, wherein the joint probability distribution over the set of action selection policy-task pairs is an equilibrium-based solution of a game, wherein the game is defined by performance measures of the action selection policies on the tasks.

Embodiment 9 is the method of embodiment 8, wherein the game includes a first player that selects an action selection policy from the pool of action selection policies and a second player that selects a task from the pool of tasks, and wherein a respective payoff received by each player is based on a performance of an agent controlled by the action selection policy selected by the first player on the task selected by the second player.

Embodiment 10 is the method of embodiment 8, wherein the equilibrium-based solution of the game is a Nash equilibrium solution of the game.

Embodiment 11 is the method of embodiment 8, wherein the equilibrium-based solution of the game is a correlated equilibrium solution of the game.

Embodiment 12 is the method of embodiment 8, wherein the equilibrium-based solution of the game is a coarse-correlated equilibrium solution of the game.

Embodiment 13 is the method of embodiment 1, wherein processing the joint probability distribution over the set of action selection policy-task pairs to generate a respective rating for each action selection policy in the pool of action selection policies comprises, for each given action selection policy: determining the rating for the given action selection policy based on a conditional probability distribution over the pool of tasks, wherein the conditional probability distribution over the pool of tasks is defined by conditioning the joint probability distribution over the set of action selection policy-task pairs on the given action selection policy.

Embodiment 14 is the method of embodiment 13, wherein for each given action selection policy, determining the rating for the given action selection policy based on the conditional probability distribution over the pool of tasks comprises: determining an expected value of a performance measure of the given action selection policy on the pool of tasks when the tasks are selected in accordance with the conditional probability distribution over the pool of tasks.

Embodiment 15 is the method of embodiment 1, wherein the environment is a real-world environment.

Embodiment 16 is the method of embodiment 15, wherein each action selection policy in the pool of action selection policies defines a policy for selecting actions to be performed by a mechanical agent to interact with the real-world environment.

Embodiment 17 is the method of embodiment 1, wherein one or more of the action selection policies in the pool of action selection policies is defined by a respective action selection neural network that is configured to process an input comprising an observation of the environment to generate a policy output for selecting an action to be performed by an agent to interact with the environment.

Embodiment 18 is a method performed by one or more computers, the method comprising: determining, for each action selection policy in a pool of action selection policies, a respective performance measure of the action selection policy on each task in a pool of tasks, wherein each action selection policy defines a policy for selecting actions to be performed by an agent in an environment; processing the performance measures of the action selection policies on the tasks to generate data defining a joint probability distribution over a set of action selection policy-task pairs, wherein each action selection policy-task pair comprises a respective action selection policy from the pool of action selection policies and a respective task from the pool of tasks; and processing the joint probability distribution over the set of action selection policy-task pairs to generate a respective rating for each task in the pool of tasks, wherein the respective rating for each task characterizes a level of difficulty of the task for action selection policies in the pool of action selection policies.

Embodiment 19 is the method of embodiment 18, further comprising: receiving a request to train an input action selection policy; and selecting tasks from the pool of tasks for use in training the input action selection policy based on the ratings of the tasks in the pool of tasks.

Embodiment 20 is the method of embodiment 19, wherein selecting tasks from the pool of tasks for use in training the input action selection policy based on the ratings of the tasks in the pool of tasks comprises: determining a probability distribution over the pool of tasks based on the ratings of the tasks in the pool of tasks; and sampling tasks from the pool of tasks for use in training the input action selection policy in accordance with the probability distribution over the pool of tasks.

Embodiment 21 is the method of embodiment 19, wherein selecting tasks for use in training the input action selection policy based on the ratings of the tasks comprises: selecting tasks of progressively higher levels of difficulty, based on the ratings of the tasks, for use in training the input action selection policy.

Embodiment 22 is the method of embodiment 21, wherein selecting tasks of progressively higher levels of difficulty, based on the ratings of the tasks, for use in training the input action selection policy comprises: determining an ordering of the tasks in the pool of tasks, in order of increasing level of difficulty, based on their ratings; and training the input action selection policy on each task in the pool of tasks in accordance with the ordering of the tasks in the pool of tasks.

Embodiment 23 is the method of embodiment 18, wherein the joint probability distribution over the set of action selection policy-task pairs is an equilibrium-based solution of a game, wherein the game is defined by performance measures of the action selection policies on the tasks.

Embodiment 24 is the method of embodiment 23, wherein the game includes a first player that selects an action selection policy from the pool of action selection policies and a second player that selects a task from the pool of tasks, and wherein a respective payoff received by each player is based on a performance of an agent controlled by the action selection policy selected by the first player on the task selected by the second player.

Embodiment 25 is the method of embodiment 23, wherein the equilibrium-based solution of the game is a Nash equilibrium solution of the game.

Embodiment 26 is the method of embodiment 23, wherein the equilibrium-based solution of the game is a correlated equilibrium solution of the game.

Embodiment 27 is the method of embodiment 23, wherein the equilibrium-based solution of the game is a coarse-correlated equilibrium solution of the game.

Embodiment 28 is the method of embodiment 18, wherein processing the joint probability distribution over the set of action selection policy-task pairs to generate a respective rating for each task in the pool of tasks comprises, for each given task: determining the rating for the given task based on a conditional probability distribution over the pool of action selection policies, wherein the conditional probability distribution over the pool of action selection policies is defined by conditioning the joint probability distribution over the set of action selection policy-task pairs on the given task.

Embodiment 29 is the method of embodiment 28, wherein for each given task, determining the rating for the given task based on the conditional probability distribution over the pool of action selection policies comprises: determining an expected value of a performance measure, on the given task, of action selection policies from the pool of action selection policies when the action selection policies are selected in accordance with the conditional probability distribution over the pool of action selection policies.

Embodiment 30 is the method of embodiment 18, wherein the environment is a real-world environment.

Embodiment 31 is the method of embodiment 30, wherein each action selection policy in the pool of action selection policies defines a policy for selecting actions to be performed by a mechanical agent to interact with the real-world environment.

Embodiment 32 is the method of embodiment 18, wherein one or more of the action selection policies in the pool of action selection policies is defined by a respective action selection neural network that is configured to process an input comprising an observation of the environment to generate a policy output for selecting an action to be performed by an agent to interact with the environment.

Embodiment 33 is a system comprising: one or more computers; and one or more storage devices communicatively coupled to the one or more computers, wherein the one or more storage devices store instructions that, when executed by the one or more computers, cause the one or more computers to perform operations of the respective method of embodiments 1 or 18.

Embodiment 34 is one or more non-transitory computer storage media storing instructions that when executed by one or more computers cause the one or more computers to perform operations of the respective method of embodiments 1 or 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   determining, for each action selection policy in a pool of action selection policies, a respective performance measure of the action selection policy on each task in a pool of tasks, wherein each action selection policy defines a policy for selecting actions to be performed by an agent in an environment;
   processing the performance measures of the action selection policies on the tasks to generate data defining a joint probability distribution over a set of action selection policy-task pairs,
      wherein each action selection policy-task pair comprises a respective action selection policy from the pool of action selection policies and a respective task from the pool of tasks; and
   processing the joint probability distribution over the set of action selection policy-task pairs to generate a respective rating for each action selection policy in the pool of action selection policies, wherein the respective rating for each action selection policy characterizes a utility of the action selection policy in performing tasks from the pool of tasks.

2. The method of claim 1, further comprising:
   selecting an action selection policy from the pool of action selection policies in accordance with the ratings for the action selection policies; and
   selecting actions to be performed by an agent to interact with an environment using the selected action selection policy.

3. The method of claim 1, further comprising:
   updating the pool of action selection policies based on the ratings of the action selection policies.

4. The method of claim 3, wherein updating the pool of action selection policies based on the ratings of the action selection policies comprises:
   selecting one or more action selection policies for removal from the pool of action selection policies based on the ratings of the action selection policies; and
   removing the selected action selection policies from the pool of action selection policies.

5. The method of claim 4, wherein selecting one or more action selection policies for removal from the pool of action selection policies based on the ratings of the action selection policies comprises:
   selecting one or more action selection policies associated with the lowest ratings from among the pool of action selection policies for removal from the pool of action selection policies.

6. The method of claim 3, wherein updating the pool of action selection policies based on the ratings of the action selection policies comprises:
   selecting one or more action selection policies for reproduction in the pool of action selection policies based on the ratings of the action selection policies; and
   adding one or more new action selection policies to the pool of action selection policies based on the action selection policies selected for reproduction.

7. The method of claim 6, wherein selecting one or more action selection policies for reproduction in the pool of action selection policies based on the ratings of the action selection policies comprises:
   selecting one or more action selection policies associated with the highest ratings from among the pool of action selection policies for reproduction in the pool of action selection policies.

8. The method of claim 1, wherein the joint probability distribution over the set of action selection policy-task pairs is an equilibrium-based solution of a game,
wherein the game is defined by performance measures of the action selection policies on the tasks.

9. The method of claim 8, wherein the game includes a first player that selects an action selection policy from the pool of action selection policies and a second player that selects a task from the pool of tasks, and wherein a respective payoff received by each player is based on a performance of an agent controlled by the action selection policy selected by the first player on the task selected by the second player.

10. The method of claim 8, wherein the equilibrium-based solution of the game is a Nash equilibrium solution of the game.

11. The method of claim 8, wherein the equilibrium-based solution of the game is a correlated equilibrium solution of the game.

12. The method of claim 8, wherein the equilibrium-based solution of the game is a coarse-correlated equilibrium solution of the game.

13. The method of claim 1, wherein processing the joint probability distribution over the set of action selection policy-task pairs to generate a respective rating for each action selection policy in the pool of action selection policies comprises, for each given action selection policy:
determining the rating for the given action selection policy based on a conditional probability distribution over the pool of tasks, wherein the conditional probability distribution over the pool of tasks is defined by conditioning the joint probability distribution over the set of action selection policy-task pairs on the given action selection policy.

14. The method of claim 13, wherein for each given action selection policy, determining the rating for the given action selection policy based on the conditional probability distribution over the pool of tasks comprises:
determining an expected value of a performance measure of the given action selection policy on the pool of tasks when the tasks are selected in accordance with the conditional probability distribution over the pool of tasks.

15. The method of claim 1, wherein the environment is a real-world environment.

16. The method of claim 15, wherein each action selection policy in the pool of action selection policies defines a policy for selecting actions to be performed by a mechanical agent to interact with the real-world environment.

17. The method of claim 1, wherein one or more of the action selection policies in the pool of action selection policies is defined by a respective action selection neural network that is configured to process an input comprising an observation of the environment to generate a policy output for selecting an action to be performed by an agent to interact with the environment.

18. A system comprising:
one or more computers; and
one or more storage devices communicatively coupled to the one or more computers, wherein the one or more storage devices store instructions that, when executed by the one or more computers, cause the one or more computers to perform operations comprising:
determining, for each action selection policy in a pool of action selection policies, a respective performance measure of the action selection policy on each task in a pool of tasks, wherein each action selection policy defines a policy for selecting actions to be performed by an agent in an environment;
processing the performance measures of the action selection policies on the tasks to generate data defining a joint probability distribution over a set of action selection policy-task pairs,
wherein each action selection policy-task pair comprises a respective action selection policy from the pool of action selection policies and a respective task from the pool of tasks; and
processing the joint probability distribution over the set of action selection policy-task pairs to generate a respective rating for each action selection policy in the pool of action selection policies, wherein the respective rating for each action selection policy characterizes a utility of the action selection policy in performing tasks from the pool of tasks.

19. One or more non-transitory computer storage media storing instructions that when executed by one or more computers cause the one or more computers to perform operations comprising:
determining, for each action selection policy in a pool of action selection policies, a respective performance measure of the action selection policy on each task in a pool of tasks, wherein each action selection policy defines a policy for selecting actions to be performed by an agent in an environment;
processing the performance measures of the action selection policies on the tasks to generate data defining a joint probability distribution over a set of action selection policy-task pairs,
wherein each action selection policy-task pair comprises a respective action selection policy from the pool of action selection policies and a respective task from the pool of tasks; and
processing the joint probability distribution over the set of action selection policy-task pairs to generate a respective rating for each action selection policy in the pool of action selection policies, wherein the respective rating for each action selection policy characterizes a utility of the action selection policy in performing tasks from the pool of tasks.

20. The non-transitory computer storage media of claim 19, wherein the operations further comprise:
selecting an action selection policy from the pool of action selection policies in accordance with the ratings for the action selection policies; and
selecting actions to be performed by an agent to interact with an environment using the selected action selection policy.

* * * * *